United States Patent
Ulm

(10) Patent No.: US 11,757,791 B2
(45) Date of Patent: *Sep. 12, 2023

(54) SYSTEM AND METHOD FOR INCREASING FLEXIBILITY AND HIGH AVAILABILITY IN REMOTE NETWORK DEVICES

(71) Applicant: ARRIS Enterprises LLC, Suwanee, GA (US)

(72) Inventor: John Ulm, Moultonborough, NH (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,070

(22) Filed: Aug. 18, 2022

(65) Prior Publication Data

US 2022/0407819 A1    Dec. 22, 2022

Related U.S. Application Data

(63) Continuation of application No. 16/292,133, filed on Mar. 4, 2019, now Pat. No. 11,456,967.

(51) Int. Cl.
*H04L 5/14* (2006.01)
*H04L 47/80* (2022.01)
(Continued)

(52) U.S. Cl.
CPC ............ *H04L 47/808* (2013.01); *H04L 5/143* (2013.01); *H04L 41/0672* (2013.01);
(Continued)

(58) Field of Classification Search
CPC ... H04L 47/808; H04L 5/143; H04L 41/0672; H04L 41/5025; H04L 41/5054; H04L 47/2425; H04L 47/762
See application file for complete search history.

(56) References Cited

U.S. PATENT DOCUMENTS 4,435,755 A * 3/1984 Meritt ................... G06F 13/122
710/38
6,377,782 B1 * 4/2002 Bishop ................ H04L 12/2801
725/111
(Continued)

OTHER PUBLICATIONS

CableLabs MAC and Upper Layer Protocols Interface Specification. 11. 6; Autonomous Load Balancing11 , Data-Over-Cable Service Interface Specifications Docsis 3.0, vol. CM-SP-MULPiv3.0-I13-100611 Jun. 11, 2010 (Jun. 11, 2010). pp. 461-466, XP002663169, Retrieved from the Internet: URL:http://www.cablelabs.com/specification s/CM-SP-MULPiv3.0-I13-100611.pdf [retrieved on Nov. 9, 2011] paragraph [11.6.8].
(Continued)

*Primary Examiner* — Parth Patel
(74) *Attorney, Agent, or Firm* — Chernoff, Vilhauer, McClung & Stenzel, LLP

(57) ABSTRACT

A network node is provided for use with a broadband data provider facility, and first and second subscriber groups, the broadband data provider facility being operable to provide first and second service group provider data. The network node includes a network access device and a downstream configuration component. The network access device converts the first and second service group provider data into first and second service group network access data, respectively. The downstream configuration component receives a configuration instruction, the first and second service group network access data and, based on the configuration instruction, provides the first service group network access data to the first subscriber group and the second service group network access data to the second subscriber group. The downstream configuration component further receives a second configuration instruction and, based on the second configuration instruction, provides the first service group
(Continued)

network access data to the first and second subscriber groups.

18 Claims, 20 Drawing Sheets

(51) Int. Cl.
    *H04L 41/0654*      (2022.01)
    *H04L 41/5025*      (2022.01)
    *H04L 41/5054*      (2022.01)
    *H04L 47/2425*      (2022.01)
    *H04L 47/762*      (2022.01)

(52) U.S. Cl.
    CPC ...... *H04L 41/5025* (2013.01); *H04L 41/5054* (2013.01); *H04L 47/2425* (2013.01); *H04L 47/762* (2013.01)

(56) References Cited

U.S. PATENT DOCUMENTS

| | | | | |
|---|---|---|---|---|
| 7,068,597 B1* | 6/2006 | Fijolek | ................. | H04L 47/125 370/230 |
| 7,441,061 B2* | 10/2008 | Gilligan | ................. | H04B 10/27 398/58 |
| 7,480,237 B2* | 1/2009 | Nolle | ................. | H04L 47/29 370/468 |
| 8,477,807 B1* | 7/2013 | Winters | ................. | H04L 12/2801 370/485 |
| 8,788,647 B1* | 7/2014 | Nolle | ................. | H04N 21/2385 375/222 |
| 8,953,445 B2* | 2/2015 | Prodan | ................. | H04N 7/17309 370/252 |
| 9,641,460 B2* | 5/2017 | Widrevitz | ................. | H04W 52/04 |
| 10,116,735 B2* | 10/2018 | Rewaskar | ................. | H04L 67/10 |
| 10,404,585 B1* | 9/2019 | Bonen | ................. | G06F 11/0721 |
| 10,715,346 B1* | 7/2020 | Bonen | ................. | H04B 15/005 |
| 2006/0251097 A1* | 11/2006 | Chapman | ................. | H04N 21/242 370/431 |
| 2008/0170853 A1* | 7/2008 | Rakib | ................. | H04L 12/2801 398/26 |
| 2009/0122846 A1* | 5/2009 | Kolze | ................. | H04L 65/611 375/222 |
| 2013/0322504 A1* | 12/2013 | Asati | ................. | H04L 41/12 375/224 |
| 2014/0359389 A1* | 12/2014 | Seastrom | ................. | H04L 1/08 714/751 |
| 2015/0052572 A1* | 2/2015 | Schemmann | ................. | H04N 21/6118 725/116 |
| 2015/0222449 A1* | 8/2015 | Salinger | ................. | H04L 27/0002 370/419 |
| 2015/0295684 A1* | 10/2015 | Jin | ................. | H04L 5/0007 370/390 |
| 2015/0295832 A1* | 10/2015 | Cotter | ................. | H04L 47/125 370/235 |
| 2016/0127264 A1* | 5/2016 | Williamson | ................. | H04L 1/0072 370/437 |
| 2016/0241334 A1* | 8/2016 | Moran, III | ................. | H04B 10/0773 |
| 2016/0359933 A1* | 12/2016 | Gould | ................. | H04L 65/611 |
| 2017/0026315 A1* | 1/2017 | Widrevitz | ................. | H04W 52/02 |
| 2017/0093555 A1* | 3/2017 | Hamzeh | ................. | H04L 5/0078 |
| 2017/0126569 A1* | 5/2017 | Seed | ................. | H04W 4/80 |
| 2017/0237491 A1* | 8/2017 | Mutalik | ................. | H04L 12/2885 398/115 |
| 2017/0302378 A1* | 10/2017 | Mutalik | ................. | H04L 12/2856 |
| 2019/0036785 A1* | 1/2019 | Pfeffer | ................. | H04L 47/783 |
| 2019/0098067 A1* | 3/2019 | Sandoval | ................. | H02J 13/00024 |
| 2019/0268037 A1* | 8/2019 | Ramesh | ................. | H04L 12/2801 |
| 2019/0288742 A1* | 9/2019 | Walley | ................. | H04L 5/18 |
| 2019/0335226 A1* | 10/2019 | Renken | ................. | H04N 21/6118 |
| 2020/0153752 A1* | 5/2020 | Chan | ................. | G06F 16/958 |
| 2020/0287840 A1* | 9/2020 | Ulm | ................. | H04L 5/143 |
| 2022/0131935 A1* | 4/2022 | Xue | ................. | H04L 41/0853 |
| 2022/0141155 A1* | 5/2022 | Zhang | ................. | H04L 41/40 370/216 |

OTHER PUBLICATIONS

International Search Report and Written Opinion RE: Application No. PCT/US2020/015625.

\* cited by examiner

SYSTEM AND METHOD FOR INCREASING FLEXIBILITY AND HIGH AVAILABILITY IN REMOTE NETWORK DEVICES

CROSS-REFERENCE TO RELATED APPLICATIONS

The present application is a continuation of U.S. patent application Ser. No. 16/292,133 filed on Mar. 4, 2019, the content of which is incorporated by reference herein.

BACKGROUND

Embodiments of the disclosure relate to systems and methods for using a network node to provide broadband data to different subscriber groups.

SUMMARY

Aspects of the present disclosure are drawn to a system and method for using a network node to dynamically reassign output ports.

The present disclosure is drawn to a network node provided for use with a broadband data provider facility, a first subscriber group and a second subscriber group, the broadband data provider facility being operable to provide first service group provider data and second service group provider data. The network node includes a network access device and a downstream configuration component. The network access device is operable to convert the first service group provider data into first service group network access data and to convert the second service group provider data into second service group network access data, wherein the first service group network access data is to be provided to the first subscriber group, and wherein the second service group network access data is to be provided to the second subscriber group. The downstream configuration component is operable to receive a configuration instruction, to receive the first service group network access data, to receive the second service group network access data and, based on the configuration instruction, to provide the first service group network access data to the first subscriber group and to provide the second service group network access data to the second subscriber group. The downstream configuration component is further operable to receive a second configuration instruction and, based on the second configuration instruction, to provide the first service group network access data to the first subscriber group and to the second subscriber group.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

Figure 1:
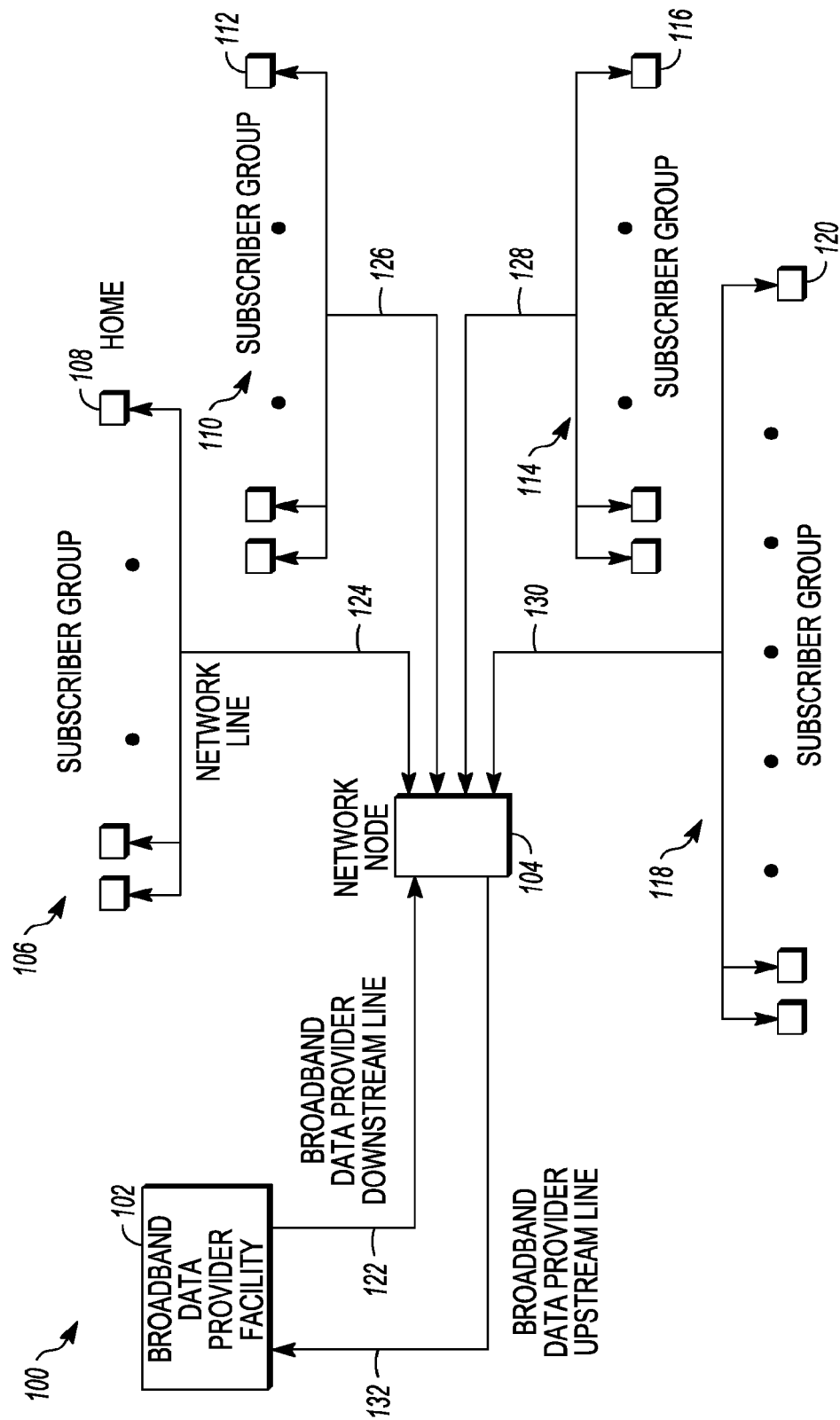
FIG. 1 illustrates a conventional broadband communication network.

There exists a need for a system and method for using a network node to easily reassign output ports.

The broadband industry is seeing a significant shift towards Distributed Access Architectures (DAA) which is pushing remote network devices out to the edge of the access networks. In the Data Over Cable Service Interface Specification (DOCSIS) environment, these DAA systems can be Remote PHY (R-PHY) or Remote MAC-PHY (R-MAC-PHY) systems where PHY is the DOCSIS Physical layer and MAC is DOCSIS Medium Access Control layer. The remote network devices are called Remote PHY Devices (RPD) and Remote MAC-PHY Devices (RMD) respectively. Generically, both types of remote network device are referred to as RxD. These remote devices contain many of the functions and features found in currently integrated Converged Cable Access Platform (CCAP) products located in a broadband provider's facility in a centralized architecture. One of the key functions of the CCAP is the DOCSIS Cable Modem Termination System (CMTS) functions.

However, these remote devices are missing some key attributes of these centralized architectures. Many of the currently integrated CCAP (I-CCAP) products are carrier grade equipment with redundancy and very high availability. This allows it to reliably carry critical services such as voice and video. Pushing remote network devices out to the nodes in the access plant, increases the plant's overall complexity and power consumption which in turn decreases the reliability of the plant. And these remote network devices now become a single point of failure in the network node.

For fiber deep networks, the situation in the current state of the art is that the size of a failure group is small enough to not be considered an issue. But DAA is also being targeted at traditional Hybrid Fiber-Coaxial (HFC) nodes whose subscriber footprint might be 10 to 20 times larger than that of a fiber deep node.

Centralized architectures also have much more flexibility then current DAA solutions. In today's HFC, it is relatively easy to segment a network node from 1 to 2 to 4 logical nodes. Once in the head end, these logical nodes can be combined as needed and mapped into I-CCAP ports. So, changing a logical node to CCAP port mappings can be done, manually, without touching the outside plant.

In the current prior art system and method for reassigning the output ports of a network node, there is a lack of flexibility to segment a nodes output ports and to dynamically re-assign them to a CMTS Service Group (SG). A service group is a collection of resources and hardware running at the network application layer and above, that provides data storage, data manipulation, presentation, and communication. A service group will provide all of the services required for one or more subscriber groups.

In this method, a remote network device with 4 output ports may have a vastly different number of homes passed on each and every port. The number of homes passed will be relatively static and might even be compensated for during a devices initial configuration. However, the instantaneous traffic loading on any given port is a function of several additional variables that include subscriber penetration, subscriber service tier distribution, and subscriber utilization.

There is no way to optimally predict in advance which output ports need to be combined into respective service groups. Since the current remote network devices lack of ability to dynamically reassign a remote network devices output ports to different SGs, the overall quality of service is diminished. Further, current network nodes have a hard-wired mapping between remote network devices and SGs, so if a remote network device is damaged or functioning improperly, the inability to reassign output ports to functioning remote network devices to cover the affected SG, the damaged remote network device in the field must be physically replaced by a technician, potentially causing extended down time to the consumers.

Additionally, there are other shortcomings associated with the current prior art remote network devices. There are several use cases that require additional Ethernet ports than what are used on the current prior art remote network devices such as subtending smaller nodes off of larger nodes, mixing RMD parent nodes (also known as Remote MAC Core or RMC) with RPD child nodes, daisy chaining RxDs down multiple leg segments, East-West connections between various RxDs in order to create a ring or mesh configuration amongst nodes, or the sharing of expensive Dense Wavelength Division Multiplexing (DWDM) optics across several nodes in cost sensitive markets such as Tier 2 and Tier 3 Multiple System Operators (MSO) and certain international markets.

A conventional system and method of distributing broadband data from a broadband data provider facility to a plurality of subscriber groups by way of a network node will now be described with reference to FIGS. 1-6.

FIG. 1 illustrates a conventional broadband communication network 100.

As shown in the figure, broadband communication network 100 includes a broadband data provider facility 102, a network node 104, a subscriber group 106, a subscriber group 110, a subscriber group 114, and a subscriber group 118. Subscriber group 106 further includes a plurality of homes, an example of which is indicated as a home 108. Subscriber group 110 further includes another plurality of homes, an example of which is indicated as a home 112. Subscriber group 114 further includes still another plurality of homes, an example of which is indicated as a home 116. Subscriber group 118 further includes yet another plurality of homes, an example of which is indicated as a home 120.

Broadband data provider facility 102 may contain any device or system that provides broadband service data to home 108, home 112, home 116 and home 120 through network node 104. In a conventional Hybrid Fiber Coax (HFC) system, a spectrum of frequencies carries the various services including the broadband service data associated with a single Service Group (SG). Broadband data provider facility 102 may provide these as a single optical signal on the downstream fiber 122 and upstream fiber 132 that encompasses one or more wavelengths. Each wavelength may be a separate SG.

Network node 104 may be any device or system, typically in the outside plant, that is able to receive an optical signal from broadband data provider facility 102 and then separate the signal into subsets of data, where each subset of data is a Service Group (SG). The Network node 104 then provides the mapping of SG to each of subscriber group 106, subscriber group 110, subscriber group 114, and subscriber group 118. A SG may be a collection of one or more subscriber groups, so some subscriber groups may share the same SG. In a conventional Hybrid Fiber Coax (HFC) system, network node 104 is operable to convert the subsets of data into signals within the radio frequency (RF) spectrum. Network node 104 is additionally operable to transmit the RF signals to each subscriber group in convention network 100. Network node 104 is further operable to receive RF signals from each subscriber group in conventional network 100 and then transmit the signals as a single optical signal to broadband data provider facility 102 on optical link 132.

Subscriber group 106, subscriber group 108, subscriber group 114, and subscriber group 118 may be any set of end-users transmitting or receiving data to broadband data provider facility 102.

In operation, broadband data provider facility 102 will provide service group provider downstream data as a single wavelength on optical signal to network node 104 via broadband data provider downstream line 122. Broadband data provider facility 102 providing data to network node 104 will now be discussed with additional reference to FIGS. 2A-B.

Figure 2A:
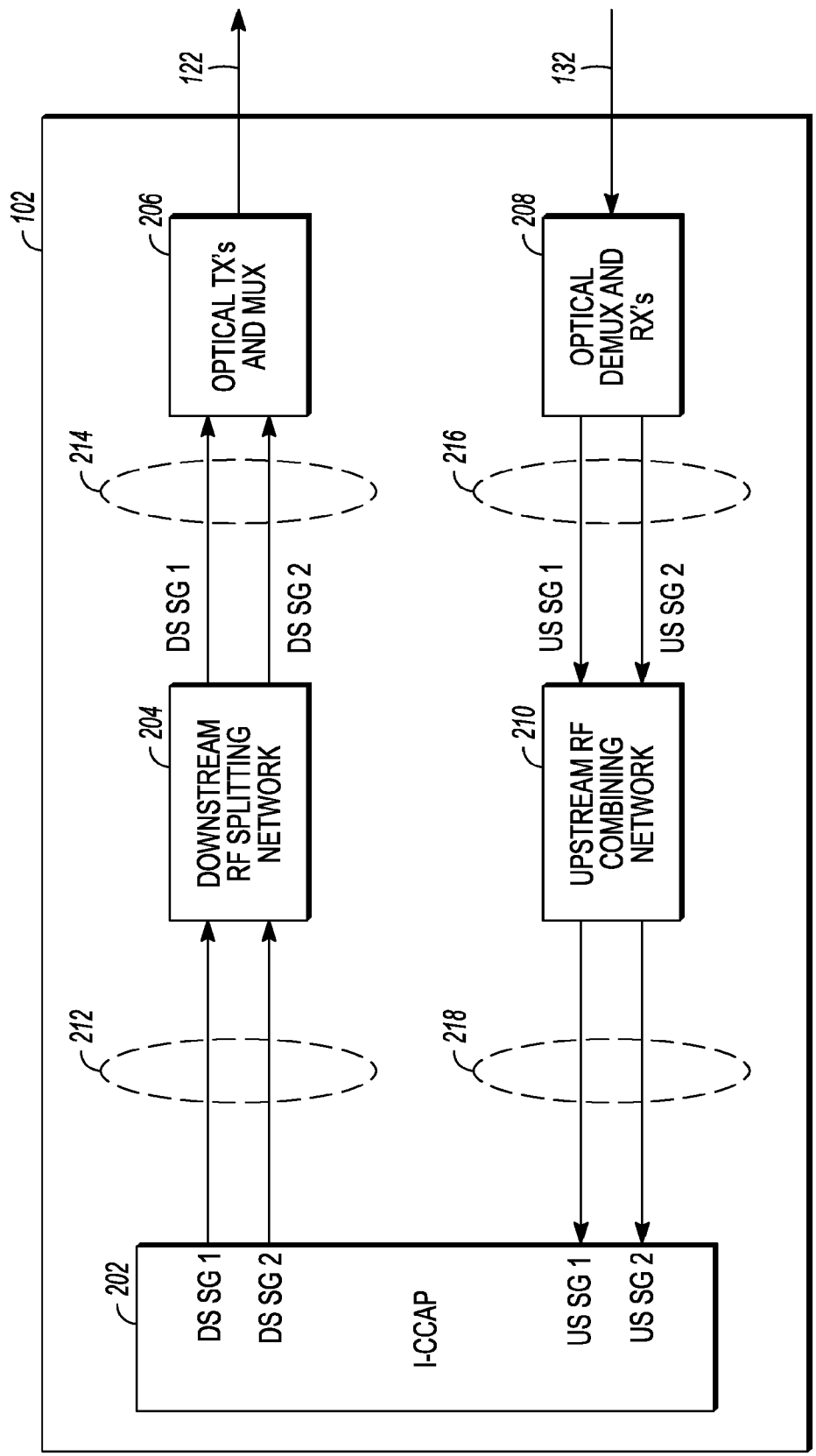
FIG. 2A illustrates an exploded view of the broadband data provider facility of FIG. 1 for traditional hybrid-fiber coax (HFC) networks using a centralized access architecture (CAA)

FIG. 2A illustrates an exploded view of the broadband data provider facility 102 of FIG. 1 for traditional hybrid-fiber coax (HFC) networks using a centralized access architecture (CAA).

As shown in FIG. 2A, broadband data provider facility 102 includes Integrated Converged Cable Access Platform (I-CCAP) 202, downstream RF splitting network 204, optical TX component 206, optical RX component 208, and upstream RF combining network 210.

I-CCAP 202 is a platform which integrates multiple functions including a DOCSIS cable modem termination system (CMTS), broadcast video Quadrature Amplitude Modulation (QAM) standard, Video On-Demand (VOD) Edge QAMs (EQAMS), and Set-top Box (STB) Out-Of-Band control. I-CCAP 202 provides broadband data for each subscriber group of FIG. 1 as an RF signal with a spectrum of frequencies to downstream RF splitting network via lines 212.

The I-CCAP 202 provides multiple RF signal outputs 212 where each line represents a separate service group. Downstream RF splitting network 204 is any device or system that is operable to receive multiple RF signals on lines 212 from I-CCAP 202 plus other RF signals from other sources in the broadband data provider facility; and then split and combine the RF signals to effectively route them on line 214 to one or more Optical TX 206 ports. The RF signals from I-CCAP 202 is a combination of a plurality of distinct service group provider data signals. In this example, as there are two distinct service groups, the signals from I-CCAP 202 are a first service group provider data signal (or first Down Stream Service Group signal "DS SG 1 signal" hereinafter) and a second service group provider data signal (or second Down Stream Service Group signal "DS SG 2 signal" hereinafter).

Optical component 206 may be any system or device that is operable to receive the RF signals from downstream RF splitting network 204 and then optically transmit (TX) and multiplex the RF signals together on multiple wavelengths for transmission as a single optical signal to network node 104 of FIG. 1. Therefore the signal from optical component 206 on broadband data provider downstream line 122 is a collection of one or more service group provider data signals.

Optical component 208 may be any system or device that is operable to receive an optical signal from network node 104 of FIG. 1 and then de-multiplex and receive (RX) the optical signal into separate RF signals for transmission to upstream RF combining network 210.

Upstream RF combining network 210 may be any device or system that is operable to receive RF signals from optical component 208, combine and split RF signals as necessary and transmit them as a single RF signal to I-CCAP 202.

In operation, I-CCAP 202 will transmit data from each service group as an RF signal to downstream RF splitting network 204 via lines 212. The number of lines in lines 212 correspond to the number of service group provider data signals, or in other words—number of service groups, provided by I-CCAP 202. In this example embodiment, there are two service groups being used which are DS SG 1 and DS SG 2.

Once received, downstream RF splitting network 204 will split any RF signal destined for more than one optical TX 206 into as many RF signals as needed. The RF signals associated with service group destined to a particular network node are then transmit to optical component 206 via lines 214. The number of lines in lines 214 correspond to the number of service groups being provided to a network node 104 of FIG. 1 via optical TX 206. Upon receiving the separate RF signals, optical component 206 will transform the RF signals into optical signals, wherein each optical signal is at a different wavelength. Once the conversion is finished, optical component 206 will multiplex the separate optical signals into a single optical signal, which it will then transmit to network node 104 of FIG. 1 via broadband data provider downstream line 122.

Similarly, a single optical signal transmit by network node 104 of FIG. 1 is received by optical component 208 via broadband data provider upstream line 132. Optical component 208 will then de-multiplex the one or more wavelengths of the single optical signal into separate optical signals. Once optical component 208 de-multiplex the optical signal, it will convert the separate optical signals into RF signals, which are then transmit to upstream RF combining network 210 via line 216, which in this example embodiment are a first upstream RF signal (US RF 1) and a second upstream RF signal (US RF 2). Upstream RF combining network 210 will then combine the RF signals as necessary and transmit them each RF signal to I-CCAP 202 via line 218, which in this example embodiment are a first upstream service group data signal (US SG 1) and a second upstream service group data signal (US SG 2). Thus each upstream service group line 218 may consist of one or more combined Optical RX output 216.

Figure 2B:
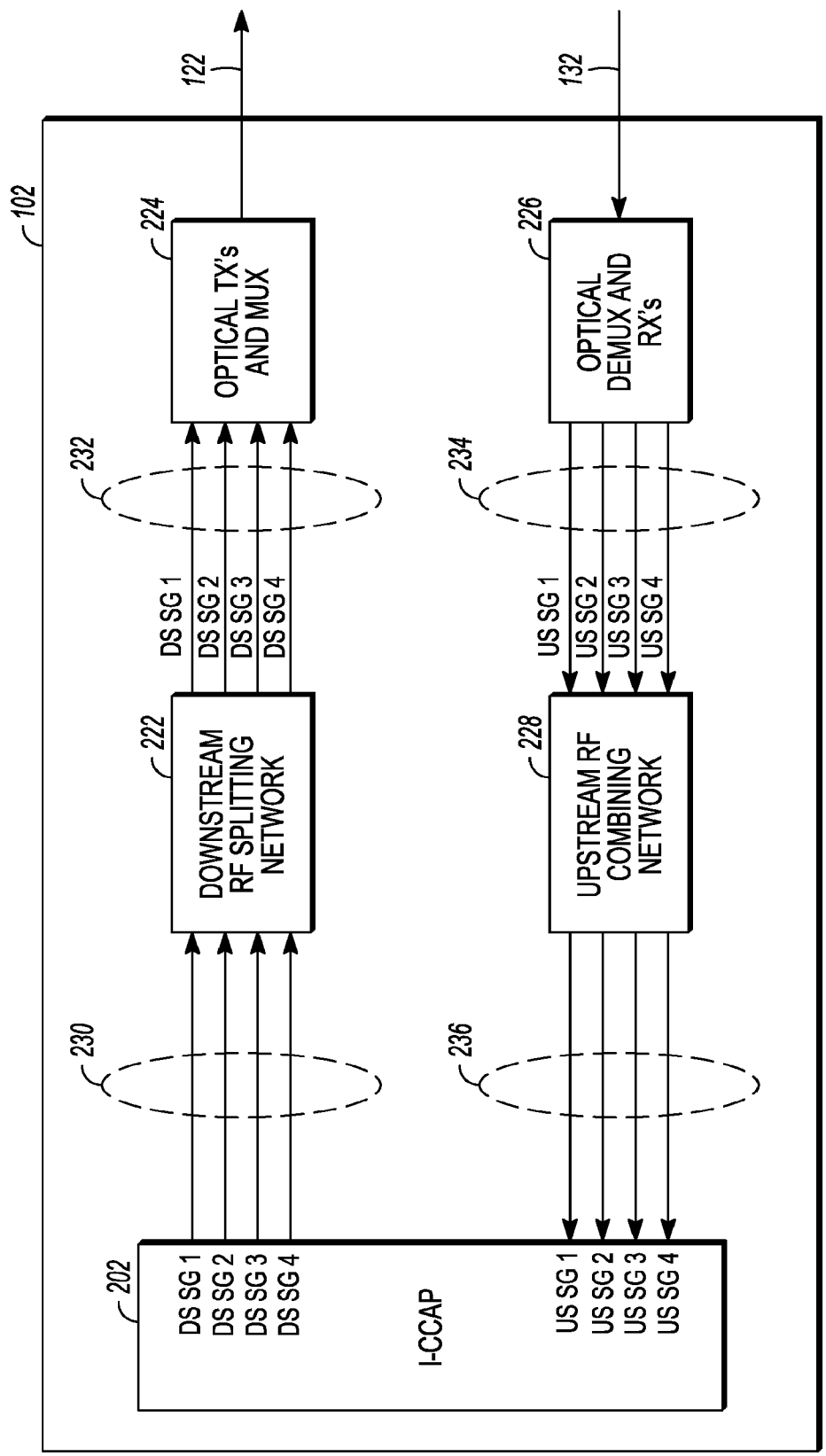
FIG. 2B illustrates an exploded view of the broadband data provider facility of FIG. 1 for traditional CAA-based HFC networks with additional service groups being available.

FIG. 2B illustrates an exploded view of the broadband data provider facility of FIG. 1 for traditional CAA-based HFC networks with additional service groups being available.

As shown in FIG. 2B, broadband data provider 102 includes I-CCAP 220, downstream RF splitting network 222, optical TX component 224, optical RX component 226, upstream RF combining network 228. The operation of each component of FIG. 2B is identical to that of FIG. 2A and, for purposes of brevity, will not be discussed again.

The operation of broadband data provider facility 102 in FIG. 2B is identical to the operation described above in FIG. 2A with the exception of the number of service groups used. In this example embodiment, four separate upstream service groups and downstream service groups are used instead of two. The use of four service groups will be further discussed in FIG. 3B.

Returning to FIG. 1, the optical signal transmitted by broadband data provider 102 is received by network node 104. Upon receiving the downstream optical signal, network node 104 de-multiplexes the one or more wavelengths in the optical signal into separate RF signals and then transmits the appropriate data as an RF signal to each of subscriber group 106 via network line 124, subscriber group 110 via network line 126, subscriber group 114 via network line 128, and subscriber group 118 via network line 130.

The operation of network node 104 receiving an optical signal and then providing data to each subscriber group will now be discussed with additional reference to FIGS. 3A-B.

Figure 3A:
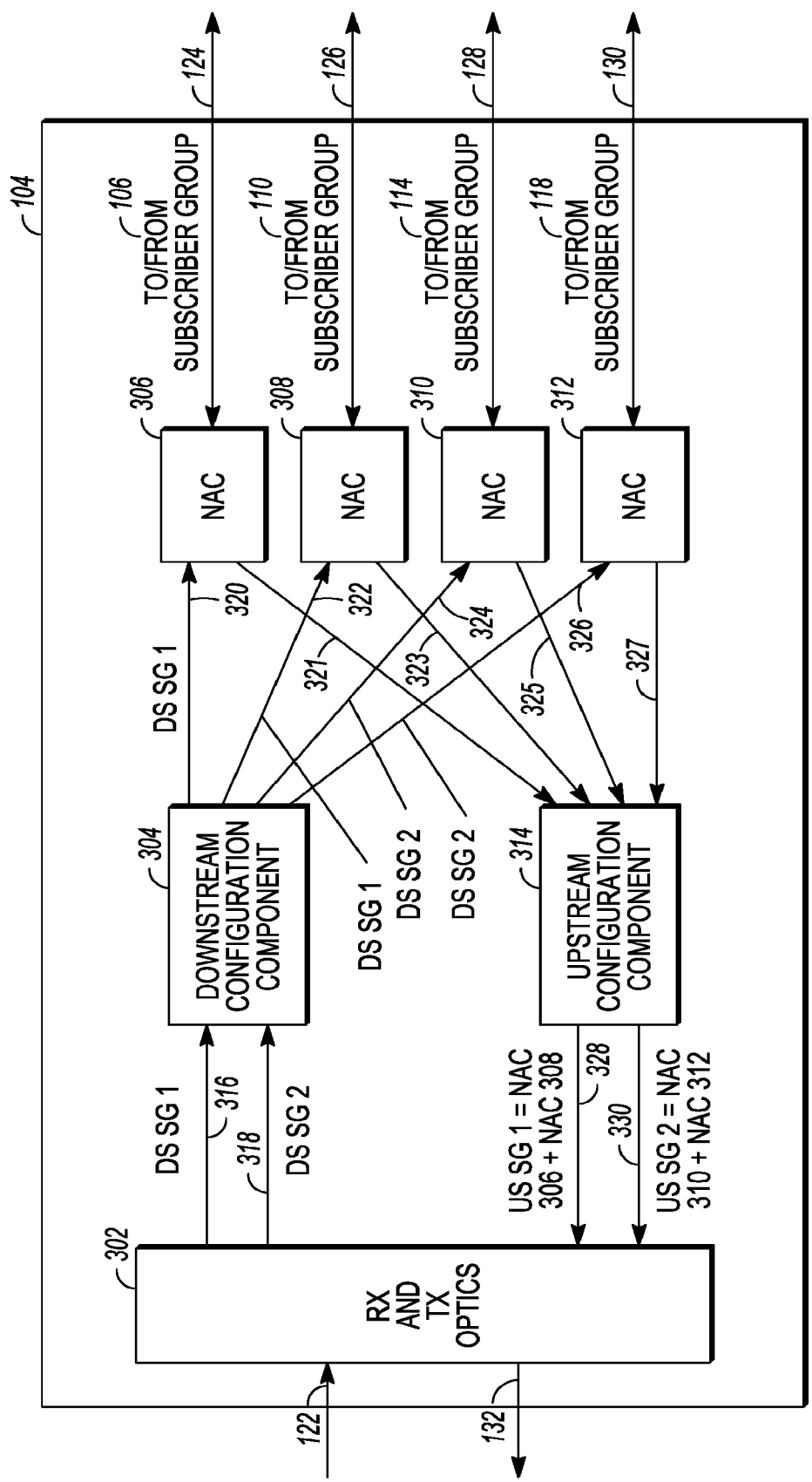
FIG. 3A illustrates an exploded view of the network node of FIG. 1 for a traditional HFC node with two downstream service groups and two upstream service groups.

FIG. 3A illustrates an exploded view of network node 104 of FIG. 1 for a traditional HFC node with two downstream service groups and two upstream service groups.

As shown in FIG. 3A, network node 104 includes an optical communication component 302, a downstream configuration component 304, a network access component (NAC) 306, a NAC 308, a NAC 310, a NAC 312, and an upstream configuration component 314.

In operation, optical communication component 302 will receive the optical service group provider downstream data signals transmitted by broadband data provider facility 102 via broadband data provider downstream line 122. Once received, optical communication component 302 will de-multiplex the wavelengths from the single optical line into separate optical signals that are then converted into RF signals. In this example embodiment, the optical signal received contains two wavelengths associated with the DS SG 1 and DS SG 2 of FIG. 2A. At this time, communication component 302 will transmit the DS SG 1 as an RF signal via a downstream service group communication channel 316 to downstream configuration component 302 and will transmit the DS SG 2 as an RF signal via a downstream service group communication channel 318 to downstream configuration component 302.

In conventional HFC network nodes, the configuration between service groups and subscriber groups are hardwired, and as such, downstream configuration component 304 must transmit the DS SG 1 or DS SG 2 to each of NAC 306, NAC 308, NAC 310 and NAC 312 based on the current configuration of network node 104.

Each of NACs 306, 308, 310 and 312 provide data over RF signals in the downstream direction to respective subscriber groups at the correct power level. Similarly, each of NACs 306, 308, 310 and 312 provide data over RF Signals in the upstream direction from the respective subscriber groups at the correct power level.

Suppose that network node 104 is in a 1×1 configuration, meaning there is just one downstream service group and one upstream service group, and further suppose that the data from one service group is transmitted to network node 104. In this example embodiment, DS SG 1 is transmitted as RF signal 320 to NAC 306, as RF signal 322 to NAC 308, as RF signal 324 to NAC 310, and as RF signal 326 to NAC 312.

After being received, NAC 306 will transmit RF signal 320 to subscriber group 106 via network line 124, NAC 308 will transmit RF signal 322 to subscriber group 110 via network line 126, NAC 310 will transmit RF signal 324 to subscriber group 114 via network line 128, and NAC 312 will transmit RF signal 326 to subscriber group 118 via network line 130. In this embodiment, all four subscriber groups share a single service group.

Simultaneously, data being transmitted by each subscriber group will be received by the subscriber groups corresponding NAC and then transmit as an RF signal to upstream configuration component 314. Upstream configuration component 314 will then combine RF signals as configured and transmit the received data as RF signals to communication component 302 based on its current configuration. Continuing the above example, since network node 104 is in a 1×1 configuration, upstream configuration component 314 will combine the four RF signals from the four subscriber group lines 321, 323, 325 and 327 into a single RF signal and transmit the resulting RF signal data as US SG 1 on an upstream service group communication channel 328 to optical communication component 302. Once received, optical communication component 302 will convert and transmit the data to broadband data provider facility 102 as a single optical signal via broadband data provider upstream line 132.

In a different example embodiment as shown in FIG. 3A, suppose that network node 104 is in a 2×2 configuration, meaning there are two downstream service groups and two upstream service groups. In a 2×2 configuration, downstream configuration component 304 would transmit DS SG 1 to two subscriber groups and DS SG 2 to two different subscriber groups. In this embodiment, DS SG 1 would be transmitted as RF signal 320 to NAC 306, as RF signal 322 to NAC 308, and DS SG 2 would be transmitted as RF signal 324 to NAC 310, and as RF signal 326 to NAC 312.

Similarly, upstream configuration component 314 would receive upstream RF signal data from all four subscriber groups, combine and transmit RF signal data from two network access devices as US SG 1 and combine and transmit RF signal data from two different network access devices as US SG 2. In this embodiment, upstream configuration component 314 would transmit combined RF data from NAC 306 and NAC 308 as US SG 1 via upstream service group communication channel 328 to communication component 302 and would transmit combined RF data from NAC 310 and NAC 312 as US SG 2 via upstream service group communication channel 330 to communication component 302.

Figure 3B:
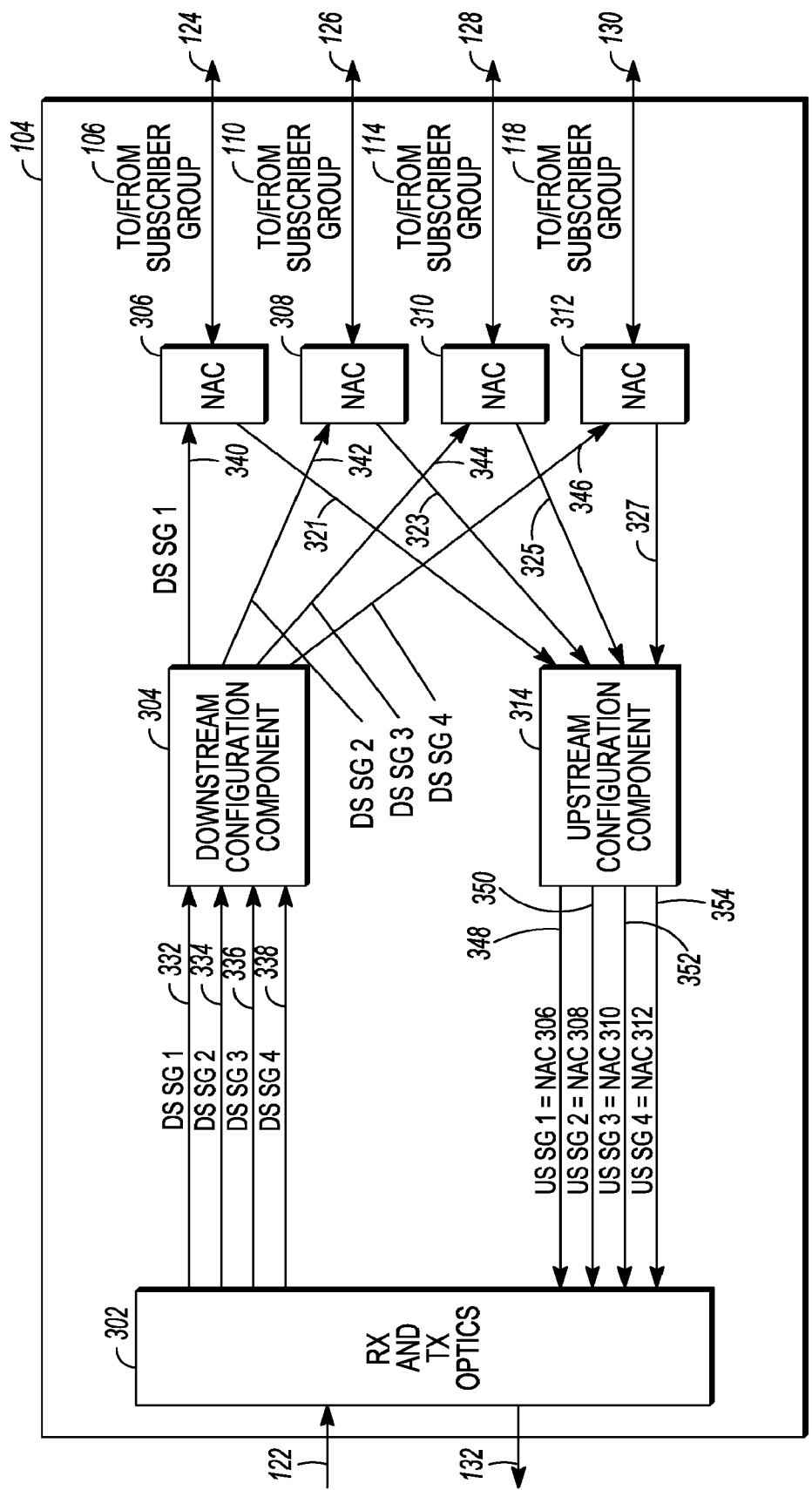
FIG. 3B illustrates an exploded view of the network node of FIG. 1 for a traditional HFC node with four service groups.

FIG. 3B illustrates an exploded view of network node 104 of FIG. 1 for a traditional HFC node with four service groups.

As shown in FIG. 3B, network node 104 includes all of the same components as described in FIG. 3A and for purposes of brevity, will not be described again here.

The operation of network node 104 operating in FIG. 3B is identical to that described above in FIG. 2B with the exception of the number of upstream service groups and downstream service groups that are available for use. In an example embodiment, suppose that network node 104 is in a 2×4 configuration, meaning there are two downstream service groups and four upstream service groups. In this embodiment, suppose that RF signal 332, which corresponds to the data from DS SG 1 of FIG. 2B, is transmit to NAC 306 and NAC 308 and that RF signal 334, which corresponds to the data from DS SG 2 of FIG. 2B is transmit to NAC 310 and NAC 312. This downstream configuration is identical to that of FIG. 3A above.

Similarly, the RF signals received from a subscriber group by each of the NACs is transmitted to upstream configuration component 314, which then transmits each individual RF signal to a different upstream service group. In this embodiment, suppose that upstream configuration component 314 transmits the RF signal from NAC 306 as RF signal 348, the RF signal from NAC 308 as RF signal 350, the RF signal from NAC 310 as RF signal 352, and the RF signal from NAC 312 as RF signal 354 to communication component 302. Component 314 does not need to do any combining of subscriber groups in this embodiment as there is a one to one mapping of subscriber group to service group.

In another example embodiment shown in FIG. 3B, network node 104 may operate in a 4×4 configuration, meaning there are four downstream service groups and four upstream groups. In this case, each downstream service group of FIG. 3B is mapped to a single NAC subscriber group while each NAC subscriber group is mapped to an upstream service group as described above. In this embodiment, suppose that RF signal 332, which corresponds to the data from DS SG 1 of FIG. 2B, is transmitted to NAC 306 by line 340, data from DS SG 2 on RF signal 334 is transmitted to NAC 308 by line 342, data from DS SG 3 on RF signal 336 is transmitted to NAC 310 by line 344, and that data from DS SG 4 on RF signal 338 is transmitted to NAC 312 by line 346. The upstream embodiment is identical to the 2×4 configuration and is not shown for brevity.

In the embodiments discussed above in reference to FIGS. 3A-B, the configuration of network node 104 is hardwired. As such, the mapping between upstream service groups, downstream service groups and the NACs of the subscriber groups of network node 104 cannot be changed remotely. If one of the service groups is damaged of malfunctioning, the subscriber group that the service group is mapped to will no long have a working network connection. In this case, in order to return service to a subscriber group, a technician must go to that location in the field and manually replace the damaged or malfunctioning hardware. Another solution, is that a technician must manually reconfigure the network node in order to map a functioning upstream or downstream service group to each subscriber group associated with the network node. For example, a network node configured as 4×4 described above with a malfunctioning downstream service group might be reconfigured as a 2×4 network node as described above to restore service to all four subscriber groups.

Another problem with conventional network nodes, is that redistributing network access data for the purpose load-balancing is not possible. A conventional network node with data flow will now be described with reference to FIG. 4.

Figure 4:
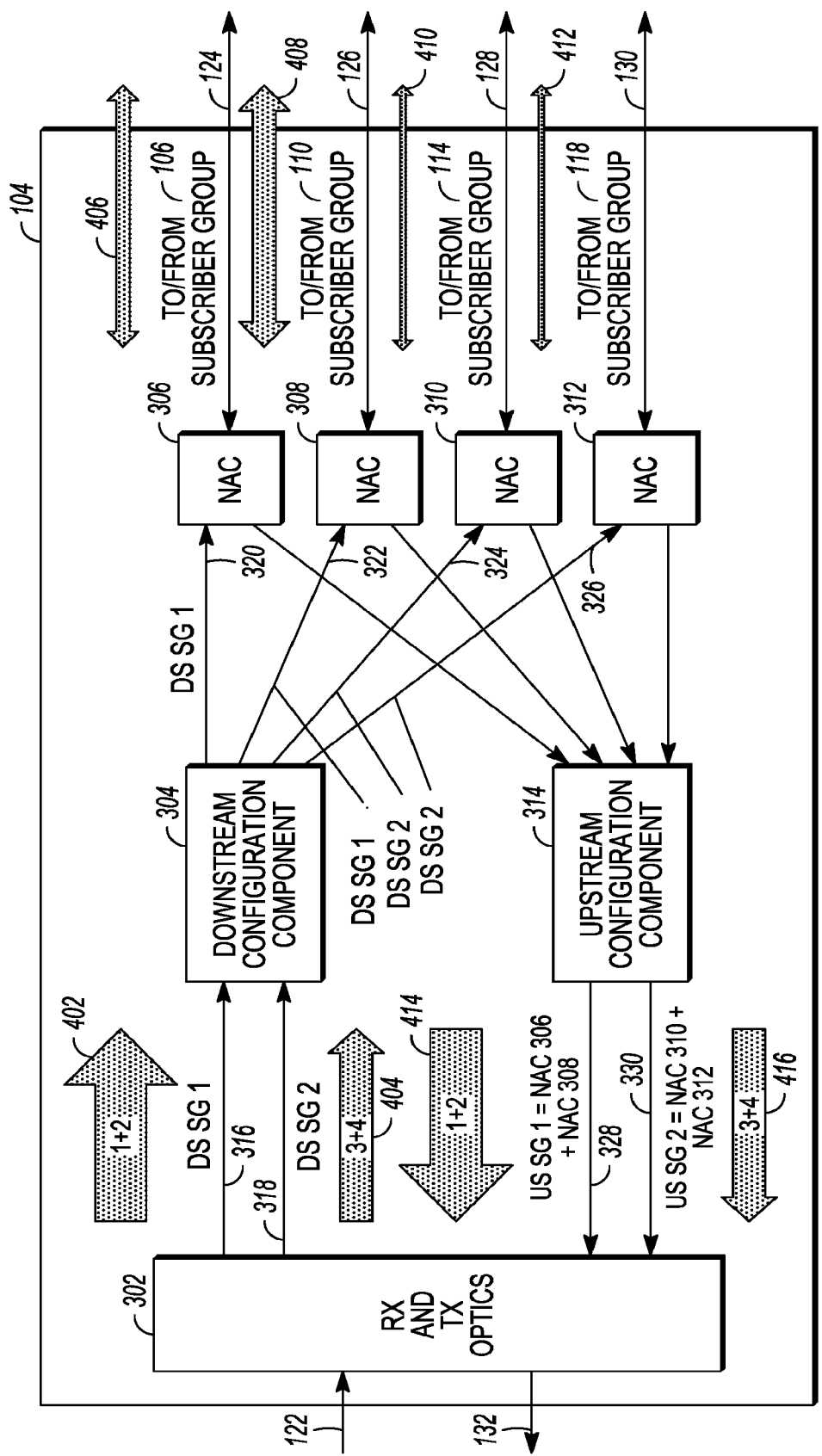
FIG. 4 illustrates an exploded view of the network node of FIG. 1 with data flow.

FIG. 4 illustrates an exploded view of network node 104 of FIG. 1 with data flow.

As shown in FIG. 4, network node 104 includes all of the same components as described above in FIGS. 3A-B and for purposes of brevity, will not be described again here. FIG. 4 additionally shows the relative amounts of service group combined data 402, combined data 404, data 406, data 408, data 410, data 412, combined data 414, and combined data 416. The size of the arrow is relative to the size of the data flow.

In operation, suppose that network node 104 is operating in a 2×2 configuration, meaning there are two downstream service groups and two upstream service groups. In this configuration, suppose that NAC 306 and NAC 308 are mapped to a first downstream service group (DS SG 1) by downstream configuration component 304 and a first upstream service group (US SG 1) by upstream configuration component 314 and that NAC 310 and NAC 312 are mapped to a second downstream service group (DS SG 2) by downstream configuration component 304 and a second upstream service group (US SG 2) by upstream configuration component 314.

Also, suppose that the subscriber group served by NAC 306 and the subscriber group served by NAC 308 are using relatively large amounts of data as shown by data 406 and data 408. In contrast, suppose that the subscriber group served by NAC 310 and the subscriber group served by NAC 312 are using relatively small amounts of data as shown by data 410 and data 412.

In this embodiment, the subscriber groups that are serviced by NAC 306 and NAC 308 are using relatively large amounts of data. The large amounts of data being used results in a large burden on their associated upstream service group 414 and their downstream service group 402. This burden on the service group network resources can lead to network congestion and a potentially reduced service speeds for the homes in the subscriber groups, which ultimately lowers their perceived quality of service.

In contrast, the subscriber groups that are serviced by NAC 310 and NAC 312 are using relatively small amounts of data. The amount of data being used by these subscriber groups is easily handled by their associated upstream service group 416 and their downstream service group 404, which results in a higher quality of service. In fact, network resources on these service groups are likely to be idle at times.

It would be beneficial if network node 104 were able to redistribute network access data in order to reduce the burden on downstream service group 402 and upstream service group 414 or to save resources and power by operating with fewer service groups. In an ideal setting, network access data would be redistributed in order to balance the load on the service groups. For example, the downstream configuration component could switch the service groups handling data 408 and data 410. In this manner, the DS SG 1 would handle data 406 and data 410, while the DS SG 2 would handle data 408 and data 412. Similarly, the upstream configuration component could adjust the upstream service groups such that the US SG 1 would then handle data 406 and data 410 while the US SG 2 would handle data 408 and data 412. However with today's technology, such redistribution of network access data can only be performed by a technician in the field manually changing network node 104 with a new downstream configuration component 304 and upstream configuration component 314 that is able to redistribute the data payloads among network lines 124, 126, 128 and 130. Further, this fix may only be temporary if subscriber usage patterns change on the subscriber groups causing a different combination to be optimal.

The conventional network delivered over downstream optical line 122 and upstream optical line 124 discussed above with reference to FIGS. 2A-4 operate in the analog domain as RF signals. However, other newer conventional networks operate optical lines 122 and 124 in the digital domain using technologies such as Ethernet and sometimes referred to as distributed access architectures (DAA). These digital networks may be generically referred to as Ethernet going forward but recognize that other embodiments could use other digital network technologies. This embodiment also describes the use of DAA with subscriber groups using an HFC access network but recognize that other embodiments could use other access networks such as passive optical networks (PON) and wireless networks.

A conventional network operating in a digital domain will now be described with additional reference to FIGS. 5-6. Some or all of the functions that used to be performed by the I-CCAP 202 of FIGS. 2A-2B inside the broadband data provider facility 102 for a centralized access architecture are now pushed to the network node in a DAA.

Figure 5:
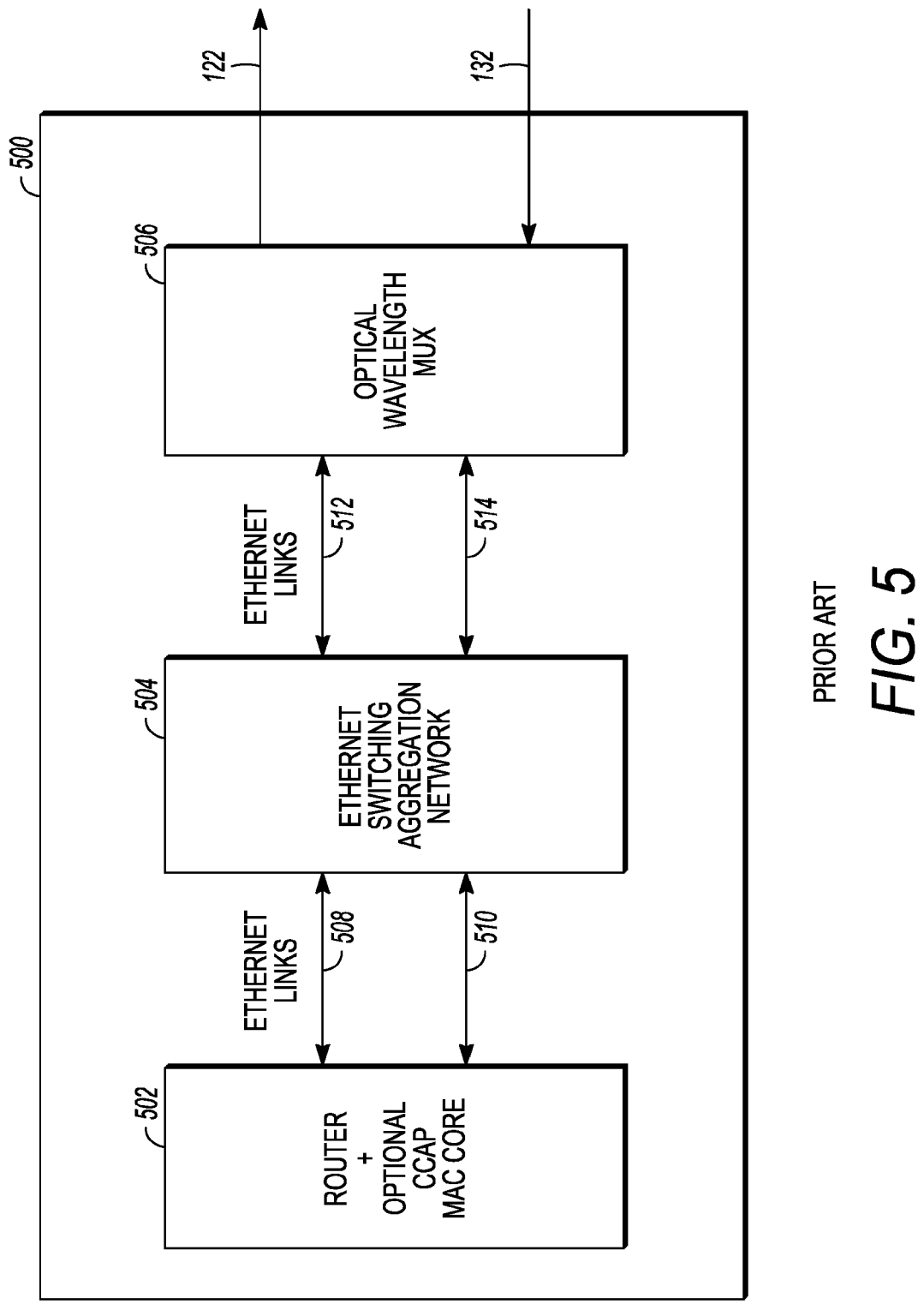
FIG. 5 illustrates an exploded view of a broadband data provider facility for a newer style HFC network using a distributed access architecture (DAA)

FIG. 5 illustrates an exploded view of a conventional broadband data provider facility 500 for a newer style HFC network using a distributed access architecture (DAA).

As shown in FIG. 5, broadband data provider facility 500 includes a router 502, an Ethernet switching aggregation network 504, and an optical wavelength multiplexer 506.

Router 502 is a platform which may also integrate higher layer CCAP functions that used to be part of I-CCAP 202 in a CAA, including routing, control, management and DOCSIS cable modem termination system (CMTS) Media Access Control (MAC). Router 502 is operable to transmit and receive data to Ethernet switch aggregation network 504 via Ethernet link 508 and Ethernet link 510.

Ethernet switching aggregation network 504 is any device or system that is operable to route or switch data between a multitude of routers including router 502 and a multitude of DAA capable network nodes including network node 602 in FIG. 6 that will be discussed shortly. Ethernet switching aggregation network 504 is operable to transmit and receive data destined to or from the network node 602 through the separate optical signals to optical wavelength multiplexer 506 via Ethernet link 512 and Ethernet link 514.

Optical wavelength multiplexer 506 may be any system or device that is operable to receive downstream optical signals from Ethernet switching aggregation network 504 and multiplex them into a single optical signal. Optical wavelength multiplexer 506 is operable to transmit the single optical signal to a network node via broadband data provider downstream line 122. Optical wavelength multiplexer 506 is additionally operable to receive a single optical signal via broadband data provider upstream line 132. Optical wavelength multiplexer 506 is further operable to de-multiplex the received single optical signal with multiple wavelengths into separate optical signals, which it may then transmit to Ethernet switching aggregation network 504.

The capabilities of conventional broadband data provider facility 500 is similar to that of conventional broadband data provider facility 102 of FIG. 2. The primary difference is that conventional broadband data provider facility 500 network input and output on line 132 and line 122 operates in a digital domain and whereas conventional broadband data provider facility 102 network input and output on line 132 and line 122 operates in an analog domain. In the digital domain, note that an Ethernet link may contain broadband provider data for multiple service groups; and that each service group could be spread across multiple Ethernet links.

In downstream operation, router 502 will receive data from an external network (not shown), which it will then transmit to Ethernet switching aggregation network 504. Once received, Ethernet switching aggregation network 504 will then aggregate and combine the data into separate optical signals that correspond to individual DAA network nodes, which will eventually be transmit to the specified subscriber groups. Once the optical signals are created, they are transmitted to optical wavelength multiplexer 506 which multiplexes the individual optical signals into a single optical signal. After the single optical signal is created, optical wavelength multiplexer 506 will transmit it to a network node via broadband data provider downstream line 122.

Similarly for upstream operation, optical wavelength multiplexer 506 will receive a single optical signal from a network node via broadband data provider upstream line 132. Once received, optical wavelength multiplexer 506 will de-multiplex the single optical signal into separate optical signals which are then transmit to Ethernet switching aggregation network 504. Ethernet switching aggregation network 504 will then transmit the separate optical signals to router 502 which can then transmit data to an external network (not shown).

Figure 6:
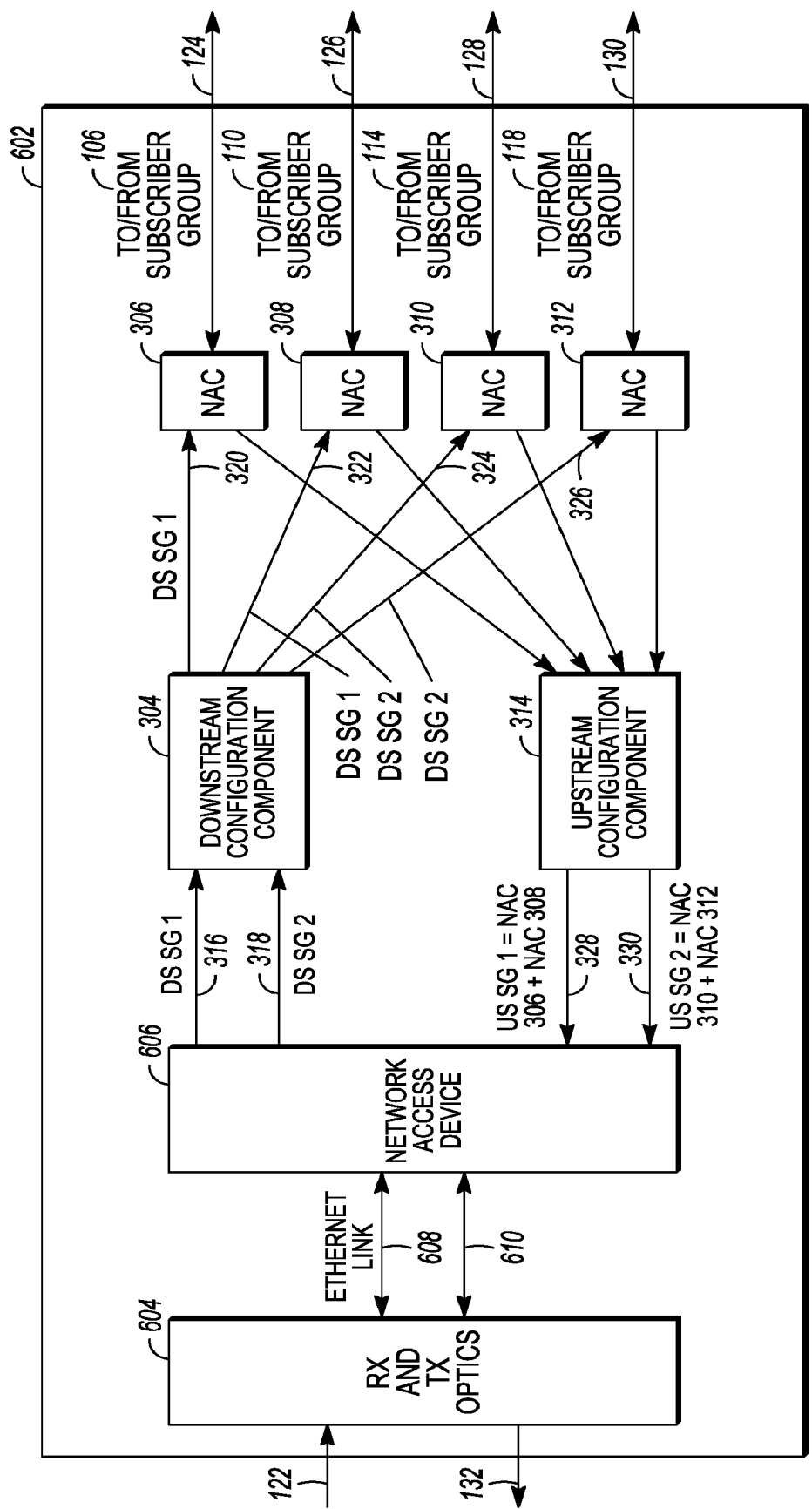
FIG. 6 illustrates an exploded view of a network node using DAA.

FIG. 6 illustrates an exploded view of a network node 602 using DAA.

As shown in FIG. 6, network node 602 includes an optical communication component 604, a network access device 606, downstream configuration component 304, NAC 306, NAC 308, NAC 310, NAC 312, and upstream configuration component 314. The operation of elements common between FIG. 6 and FIGS. 3A-4 are identical, and for purposes of brevity, will not be described again here.

Optical communication component 604 may be any system or device that is operable to receive a single optical signal with one or more wavelengths from a broadband data provider facility via broadband data provider facility downstream line 122, and transmit a single optical signal with one or more wavelengths to a broadband data provider facility via broadband data provider facility upstream line 132. Optical communication component 604 is operable to transmit data from broadband data provider facility downstream line 122 to network access device 606 via Ethernet link 608 or Ethernet link 610. Optical communication component 604 is additionally operable to receive data from network access device 606 via Ethernet link 608 or Ethernet link 610 and transmit to a broadband data provider facility via broadband data provider facility downstream line 132.

Network access device 606 communicates with the broadband service provider facility 500 over Ethernet link 608 and Ethernet link 610. Network access device 606 is operable to decode data over the Ethernet links and associate it to individual upstream and downstream service groups. In a DOCSIS DAA embodiment, the network access device 606 contains at least the DOCSIS CMTS Physical (PHY) layer. It converts the downstream data from Ethernet link 608 and Ethernet link 610 into RF signals to transmit on downstream service group DS SG 1 on line 316 and downstream service group DS SG 2 on line 318. Similarly, the network access device 606 receives RF signals from upstream service group US SG 1 on line 328 and upstream service group US SG 2 on line 330. The network access device 606 then converts these RF signals to data that is then transmit to the broadband service provider facility 500 over Ethernet link 608 and Ethernet link 610. The network access device 606 may perform additional operations on the service group data including the DOCSIS CMTS MAC layer functions.

While operation of network node 602 is similar to that of network node 104 as described above in FIGS. 3A-4, there is a key difference. Optical communication component 302 in network node 104 is operating in the analog domain and converts an analog optical signal from broadband data provider facility 102 on line 122 to RF signals for downstream service group DS SG 1 on line 316 and downstream service group DS SG 2 on line 318; in addition to taking upstream service group US SG 1 RF signals from line 328 and upstream service group US SG 2 RF signals from line 330 and converts that to analog optical signals transmitted to broadband data provider facility 102 on line 132. Optical communication component 604 in network node 602 operates in the digital domain. It converts optical Ethernet digital signals from broadband data provider facility 102 on line 122 and line 132 to Ethernet digital signals for network access device 604 on line 608 and line 610. The network access device is then responsible for converting between the digital domain and the analog domain. It outputs RF signals for downstream service group DS SG 1 on line 316 and downstream service group DS SG 2 on line 318; in addition to taking upstream service group US SG 1 RF signals from line 328 and upstream service group US SG 2 RF signals from line 330. The operation of downstream configuration component 304, NAC 306, NAC 308, NAC 310, NAC 312, and upstream configuration component 314 is then identical for network node 104 and network node 602.

Since downstream configuration component 304 is identical in function, so network node 602 will have the same restrictions as network node 104 that will require a technician in the field to manually change the configurations. Similarly the upstream configuration component 314 is identical in function, so network node 602 will have the same restrictions as network node 104 that will require a technician in the field to manually change the configurations.

The network access device 606 now contains some or all CMTS functions that used to be in I-CCAP 202. These complex CMTS functions have redundancy in I-CCAP in case of failure but have no redundancy in the network node 602. This introduces a new point of potential failure into the system.

In light of the above discussion, it is clear that the current system and method for using a network node has shortcomings. There exists a need for using a network node to dynamically redistribute network access data in the event that a communication line or CMTS function fails or in the event that the load should be re-balanced as shown in previous discussion on FIG. 4 or in the event some service groups are disabled to save resources and power.

The present disclosure provides systems and methods for using a network node to dynamically reassign output ports to address the shortcomings of the prior art methods.

In accordance with aspects of the present disclosure, a network node is provided which contains a network access device, a downstream configuration component and an upstream configuration component. When providing data in the downstream direction, i.e., in a direction from the broadband data provider facility to the individual subscriber groups, the network access device will receive data from a broadband data provider facility, which it will then convert into data for each of the service groups that the network node supports. The network access device then transmits the data for each individual service group to the downstream configuration component for mapping to the individual subscriber groups. The network access device will also transmit an instruction which will instruct the downstream configuration component on how to assign the service group resources to the subscriber group outputs. When providing data in the upstream direction, i.e., in a direction from the individual subscriber groups to the broadband data provider facility, the network access device will also transmit an instruction which will instruct the upstream configuration component on how to assign inputs originating from the subscriber groups to the service group resources. The upstream configuration component will receive data from each of the subscriber groups and combine into appropriate upstream service groups and provide the upstream service groups to the network access device. The network access device will then convert the data received from each of the upstream service groups that the network node supports into data to be transmitted to the broadband data provider facility.

When providing data in the downstream direction, the downstream configuration component will then transmit the data intended for each subscriber group based on the instructions transmitted by the network access device. The network node is able to monitor the downstream communication links between the broadband provider facility and downstream configuration component, to determine if a link is malfunctioning. If it is determined that a link is malfunctioning and not providing data to its designated subscriber group, the downstream configuration component can be dynamically reassigned such that a functioning service group can provide data to the affected subscriber group. When providing data in the upstream direction, the upstream configuration component will then transmit the data from each subscriber group based on the instructions transmitted by the network access device to the upstream configuration component. The network node is able to monitor the upstream communication links between the upstream configuration component and the broadband provider facility, to determine if a link is malfunctioning. If it is determined that a link is malfunctioning and not providing data from its designated subscriber group, the upstream configuration component can be dynamically reassigned such that data from the affected subscriber group is provided to a functioning upstream service group.

An aspect of the present disclosure also provides a network access device which is able to monitor the amount of data being transmitted to each service group and subscriber group; and then based on the amount of traffic, reconfigure the service group to subscriber group mapping by instructing the downstream configuration component and upstream configuration component. For example, suppose the network access device determines that there is one subscriber group using a significant amount of data and three other subscriber groups using a minimal amount of data. In this case, the network access device could send an instruction to the downstream configuration component which would map the three subscriber groups using a minimal amount of data to be serviced by a second service group, allowing the first service group to handle just the subscriber group using a significant amount of data.

An aspect of the present disclosure also proposes a method of using instructions from a broadband provider facility in order to configure the network node. Instructions on how the network node should provide data to a set of subscriber groups could be transmitted by the broadband provider facility to the network access device, which would then instruct the downstream configuration component and upstream configuration component in order to assign or reassign the various service group to subscriber group mapping.

Advantages of systems and methods for using a network node to dynamically reassign output ports include: detecting malfunctioning or damaged components and communication lines and reassign output ports to affected subscriber groups; monitoring traffic on multiple subscriber groups and redistributing network access data; and disabling service groups to save resources and power and redistributing network access data to active service groups.

A high-level description of a system and method for using a network node to dynamically reassign output ports of the present disclosure is as follows.

First, the network access device of the network node will assign a service group to each subscriber group. The network access device will then monitor the amount of traffic on each service group and subscriber group and change service group to subscriber group mapping to redistribute network access data if necessary. If the overall amount of traffic is sufficiently low, the network access device can disable a service group to save resources and power, and redistribute the network access data to active service groups.

Next, the network access device will monitor each service group communication paths to see if any of the devices are malfunctioning. If a malfunction is detected, the network access device will then reallocate resources by changing service group to subscriber group mapping to use the functioning service groups to handle the traffic of the subscriber group affected by the malfunctioning service group.

Aspects of the present disclosure will now be described with reference to FIGS. 7-17.

A first example embodiment of a system and method of distributing broadband data from a broadband data provider facility to a plurality of subscriber groups by way of a dynamically re-assignable network node will now be described with reference to FIGS. 7-13.

Figure 7:
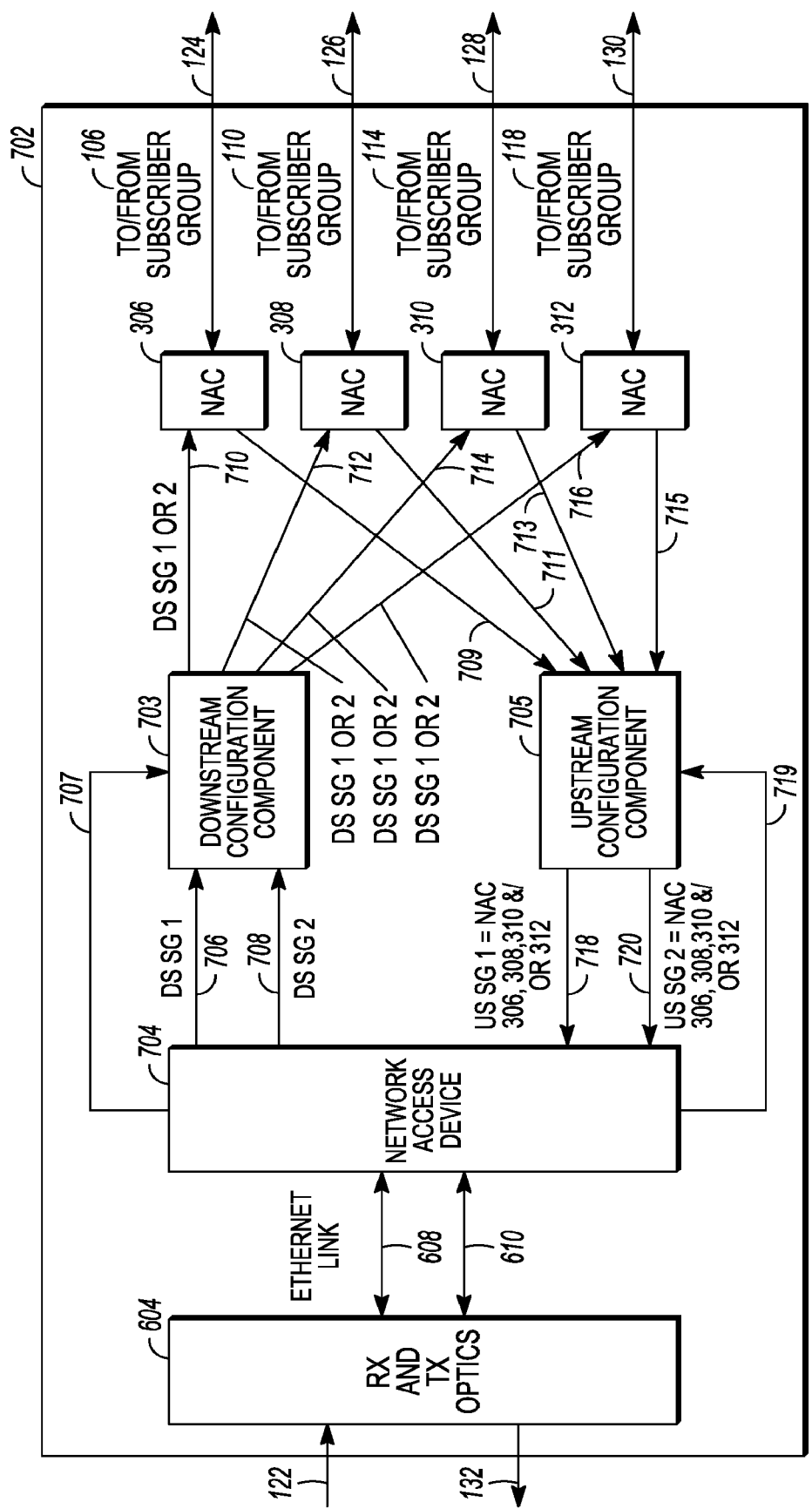
FIG. 7 illustrates a network node in accordance with aspects of the present disclosure.

FIG. 7 illustrates a network node 702 in accordance with aspects of the present disclosure. This first example embodiment shows a network node 702 with one or two service groups mapped to four subscriber groups. Other embodiments may have network nodes with more service groups and may have more or less subscriber groups then this example. Other embodiments may have network nodes where the number of upstream service groups is different than the number of downstream service groups.

As shown in the figure, network node 702 includes optical communication component 604, NAC 306, NAC 308, NAC 310, NAC 312, a downstream configuration component 703, a network access device 704, and an upstream configuration component 705. The operation of elements common between FIG. 7 and FIGS. 3A-6 are identical, and for purposes of brevity, will not be described again here.

In this example, optical communication component 604, NAC 306, NAC 308, NAC 310, NAC 312, downstream configuration component 703, network access device 704, and upstream configuration component 705 are illustrated as individual devices. However, in some embodiments, at least two of optical communication component 604, NAC 306, NAC 308, NAC 310, NAC 312, downstream configuration component 703, network access device 704, and upstream configuration component 705 may be combined as a unitary device. Further, in some embodiments, at least one of optical communication component 604, NAC 306, NAC 308, NAC 310, NAC 312, downstream configuration component 703, network access device 704, and upstream configuration component 705 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components. Further, the processor may be implemented as a field programmable gate array ("FPGA").

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable or wireless medium; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

Downstream configuration component 703 may be any device or system that is operable to: receive a configuration instruction from network access device 704, as will be described in greater detail below; to receive first service group network access data for DS SG 1 from network access device 704 via line 706, as will be described in greater detail below; to receive second service group network access data for DS SG 2 from network access device 704 via line 708, as will be described in greater detail below; to provide the first service group network access data to a first of NAC 306, NAC 308, NAC 310, or NAC 312 based on the configuration instruction and to provide the second service group network access data to a second of NAC 306, NAC 308, NAC 310, or NAC 312 based on the configuration instruction, as will be described in greater detail below; to receive a second configuration instruction, as will be described in greater detail below; and to provide the first service group network access data to a first of NAC 306, NAC 308, NAC 310, or NAC 312 based on the second configuration instruction and to provide the second service group network access data to a second of NAC 306, NAC 308, NAC 310, or NAC 312 based on the second configuration instruction, as will be described in greater detail below.

Network access device 704 may be any device or system that is operable to: receive a first service group provider data and a second service group provider data from optical communication component 604, as will be described in greater detail below; convert the first service group provider data into first service group network access data, as will be described in greater detail below; convert the second service group provider data into a second service group network access data, as will be described in greater detail below; to transmit a configuration instruction to downstream configuration component 703, as will be described in greater detail below; and to transmit a configuration instruction to upstream configuration component 705, as will be described in greater detail below.

In some embodiments, network access device 704 may be further operable to: generate the second configuration instruction based on a first traffic load of the first network access data and a second traffic load of the second traffic network access data, as will be described in greater detail below; generate the second configuration signal based on an instruction received from a broadband data provider facility, as will be described in greater detail below; and generate the second configuration instruction based on the failure of downstream configuration component 703 to receive either of the first service group network access data or the second service group network access data, as will be described in greater detail below.

Upstream configuration component 705 may be any device or system that is operable to: receive a configuration instruction from network access device 704, as will be described in greater detail below; to transmit first service group network access data for US SG 1 to network access device 704 via line 718, as will be described in greater detail below; to transmit second service group network access data for US SG 2 to network access device 704 via line 720, as will be described in greater detail below; to receive the first subscriber group network access data from a first of NAC 306, NAC 308, NAC 310, or NAC 312 and to receive the second service group network access data from a second of NAC 306, NAC 308, NAC 310, or NAC 312; to receive a second configuration instruction, as will be described in greater detail below; to transmit third service group network access data for US SG 1 to network access device 704 via line 718 based on the second configuration instruction, as will be described in greater detail below; to transmit fourth service group network access data for US SG 2 to network access device 704 via line 720 based on the second configuration signal, as will be described in greater detail below; to receive the third subscriber group network access data from a first of NAC 306, NAC 308, NAC 310, or NAC 312 and to receive the fourth service group network access data from a second of NAC 306, NAC 308, NAC 310, or NAC 312.

An example method of network node 702 dynamically assigning output ports in accordance with aspects of the present disclosure will now be described with additional reference to FIGS. 8-13.

Figure 8:
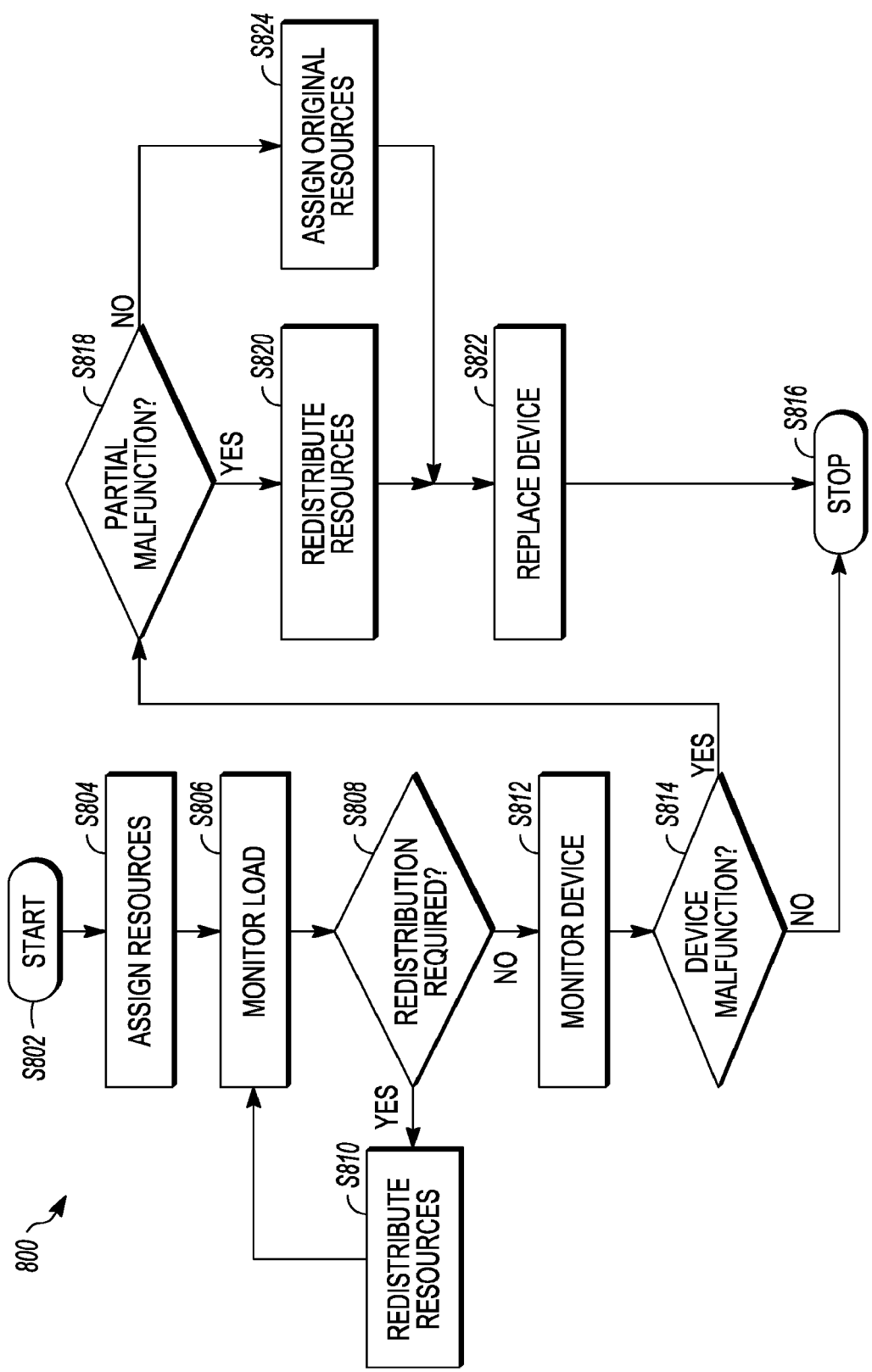
FIG. 8 illustrates an example method of operating a network node in accordance with aspects of the present disclosure.

FIG. 8 illustrates method 800 for dynamically assigning output ports in accordance with aspects of the present disclosure.

As shown in the figure, method 800 starts (S802) and resources are assigned (S804). In an example embodiment, network node 702 assigns resources. For example, returning to FIG. 7, for downstream communication, network node 702 receives data from the broadband data provider facility (not shown) via broadband data provider downstream line 122. In order to begin providing service group network access data to subscriber groups, network access device 704 transfers service group network access data received from the broadband data provider to each of NAC 306, NAC 308, NAC 310, and NAC 312 by way of downstream configuration component 703. In particular, downstream configuration component 703: provides service group network access data to NAC 306 via line 710, wherein NAC 306 then provides the service group network access data to subscriber group 106 via network line 124; provides service group network access data to NAC 308 via line 712, wherein NAC 308 then provides the service group network access data to subscriber group 110 via network line 126; provides service group network access data to NAC 310 via line 714, wherein NAC 310 then provides the service group network access data to subscriber group 114 via network line 128; and provides service group network access data to NAC 312 via line 716, wherein NAC 312 then provides the service group network access data to subscriber group 118 via network line 130. The data from the broadband data provider facility includes first service group provider data and second service group provider data. In some embodiments, the data from the broadband data provider facility further includes a configuration instruction that describes how network node 702 should be configured.

For upstream communication, network node 702 additionally receives subscriber group network access data from subscriber group 106 via network line 124, receives subscriber group network access data from subscriber group 110 via network line 126, receives subscriber group network access data from subscriber group 114 via network line 128 and receives subscriber group network access data from subscriber group 118 via network line 130. In particular: NAC 306 receives subscriber group network access data from subscriber group 106 via network line 124 and provides the subscriber group network access data from subscriber group 106 to upstream configuration component 705 via line 709; NAC 308 receives subscriber group network access data from subscriber group 110 via network line 126 and provides the subscriber group network access data from subscriber group 110 to upstream configuration component 705 via line 711; NAC 310 receives subscriber group network access data from subscriber group 114 via network line 128 and provides the subscriber group network access data from subscriber group 114 to upstream configuration component 705 via line 713; and NAC 312 receives subscriber group network access data from subscriber group 118 via network line 130 and provides the subscriber group network access data from subscriber group 118 to upstream configuration component 705 via line 715. In order to begin providing service group data to the broadband data provider facility from the subscriber groups, network access device 704 instructs upstream configuration component 705 transfer the data from each of NAC 306, NAC 308, NAC 310, and NAC 312 to one of first service group provider data and second service group provider data. In some embodiments, the data from the broadband data provider facility further includes a configuration instruction that describes how network node 702 should be configured.

In some embodiments, network access device 704 determines how the service groups should be transferred to each of NAC 306, NAC 308, NAC 310, and NAC 312 based on instructions from the broadband data provider facility. For example, the service group provider data from the broadband data provider (not shown) may include a configuration instruction that will dictate which service group data should be provided to which subscriber group during downstream communication and that will dictate which subscriber group data should be provided to which service group during upstream communication.

In other embodiments, network access device 704 determines how the service groups should be transferred to each of NAC 306, NAC 308, NAC 310, and NAC 312 based on traffic loads of network access data on network lines 124, 126, 128 and 130. For example, network access device 704 may monitor the traffic loads of network access data on network lines 124, 126, 128 and 130 and generate a configuration instruction that will dictate which downstream service group data should be provided to which subscriber group. Similarly, during upstream communication, network access device 704 determines how subscriber group network access data from each of NAC 306, NAC 308, NAC 310 and NAC 312 should be transferred to each of the service groups based on traffic loads of network access data on network lines 124, 126, 128 and 130.

In still other embodiments, network access device 704 determines how the service groups should be transferred to each of NAC 306, NAC 308, NAC 310, and NAC 312 based on traffic on line 706 and line 708. Here, it should be noted that line 706 is a downstream service group communication channel and line 708 is also a downstream service group communication channel. If some part of network access device 704 becomes faulty such that one of lines 706 or 708 goes down, network access device 704 may generate a configuration instruction that will dictate which service group data should be provided to which subscriber group. Similarly, for upstream communication, network access device 704 determines subscriber group network access data from each of NAC 306, NAC 308, NAC 310 and NAC 312 should be transferred to each of the service groups based on traffic on line 720 and line 708. Here, it should be noted that line 718 is an upstream service group communication channel and line 720 is also an upstream service group communication channel. If some part of network access device 704 becomes faulty such that of the communication path associated with lines 718 or 720 goes down, network access device 704 may generate a configuration instruction that will dictate which subscriber group data will be provided to which service group.

For purposes of discussion, consider an example embodiment wherein network access device 704 receives a configuration instruction from the broadband data provider facility (not shown). Further, in this example let the configuration instruction indicate that network node 702 should begin operating in a default configuration, which in this example embodiment is a 2×2 configuration wherein data from DS SG 1 is to be provided to NAC 306 and NAC 308 and data from DS SG 2 is to be provided to NAC 310 and NAC 312. Similarly, the instruction will instruct upstream configuration component 705 to transmit data from NAC 306 and NAC 308 to network access device 704 via line 718, which corresponds to US SG 1, and to transmit data from NAC 310 and NAC 312 to network access device 704 via line 720, which corresponds to US SG 2.

At this time, network access device 704 generates a configuration instruction that will instruct downstream configuration component 703 to transmit data from DS SG 1 to NAC 306 and NAC 308 and to transmit data from DS SG 2 to NAC 310 and NAC 312. Similarly, the instruction will instruct upstream configuration component 705 to transmit data from NAC 306 and NAC 308 to network access device 704 via line 718, which corresponds to US SG 1, and to transmit data from NAC 310 and NAC 312 to network access device 704 via line 720, which corresponds to US SG 2.

Once generated, the instruction is transmitted to downstream configuration component 703 via line 707 and to upstream configuration component 705 via line 719. After transmitting the instruction, downstream data is received as a single optical signal with multiple wavelengths from a broadband data provider facility via broadband data provider facility downstream line 122 by optical communication component 604 and upstream data is transmitted as a single optical signal with multiple wavelengths via broadband data provider facility upstream line 132 by optical communication component 604.

For downstream communication, after receiving the single optical signal with multiple wavelengths, optical communication component 604 de-multiplexes the signal into separate Ethernet links. In this embodiment, two links are shown as Ethernet link 608 and Ethernet link 610, but this could be more in other embodiments. The Ethernet links carries the communication and data between the network node and the broadband service provider facility. Network access device 704 sorts through the Ethernet packets and assigns data that corresponds to downstream service group data DS SG 1 and DS SG 2. The network access device 704 does any additional processing such as the DOCSIS CMTS PHY and optionally the CMTS MAC processing, and then transmits DS SG 1 as an RF signal to downstream configuration component 703 via line 706, and the second optical signal corresponding to DS SG 2 to downstream configuration component 703 via line 708.

After receiving the downstream service group signals, downstream configuration component 703 will transmit one service group to each one of NAC 306, NAC 308, NAC 310, or NAC 312 based on the instruction signal that was received earlier from network access device 704. In this example embodiment, downstream configuration component 703 transmits the data corresponding to DS SG 1 to NAC 306 via line 710 and NAC 308 via line 712. Similarly, downstream configuration component 703 transmits the data correspond to DS SG 2 to NAC 310 via line 714 and NAC 312 via line 716.

Once the downstream data is received, NAC 306 will transmit the data corresponding to downstream service group data DS SG 1 to subscriber group one via line 124, NAC 308 will transmit the data corresponding to DS SG 1 to subscriber group two via line 126, NAC 310 will transmit the data corresponding to DS SG 2 to subscriber group three via line 128, and NAC 312 will transmit the data corresponding to downstream service group data DS SG 2 to subscriber group four via line 130.

Meanwhile, for upstream communication, upstream data from each subscriber group will be transmitted to network node 702. Upstream data transmit to NAC 306 via line 124 is transmitted to upstream configuration component 705 via line 709, NAC 308 via line 126 is transmitted to upstream configuration component 705 via line 711, NAC 310 via line 128 is transmitted to upstream configuration component 705 via line 713, and NAC 312 via line 130 is transmit to upstream configuration component 705 via line 715.

After data is received, upstream configuration component 705 uses previous instruction to determine where the data should go. It transmits upstream subscriber group data from NAC 306 and NAC 308 to network access device 704 via line 718, which corresponds to upstream service group data US SG 1. Similarly, upstream configuration component 703 transmits upstream subscriber group data from NAC 310 and NAC 312 to network access device 704 via line 720, which corresponds to upstream service group data US SG 2.

Network access device 704 then does any additional processing such as the DOCSIS CMTS PHY and optionally the CMTS MAC processing. It then transmits the upstream service group data received via line 718 and line 720 to optical communication component 604 via Ethernet link 608 and Ethernet link 610. Communication component 604 then multiplexes the signals together into a single optical signal with multiple wavelengths, which is then transmit to a broadband data provider facility via upstream broadband data provider facility line 132.

Returning to FIG. 8, once resources have been assigned (S804), the traffic load of network access data is monitored (S806). In an example embodiment, network node 702 is able to monitor the traffic load being handled by each upstream service group and downstream service group.

Returning to FIG. 8, after load monitoring is performed (S806) it is determined whether redistribution of network access data is required (S808). If redistribution of network access data is required (Y at S808), resources will be redistributed (S810). In an example embodiment, network access device 704 performs the redistribution of network access data. This will be described in greater detail with reference to FIGS. 4 and 9.

Suppose for purposes of discussion, that originally, line 706 is providing downstream service group data DS SG 1 intended for subscriber group 106 via network line 124 and for subscriber group 110 via network line 126 in an amount similar to DS SG 1 on downstream service group communication channel 316 as shown in arrow 402 from above in FIG. 4, whereas line 708 is providing downstream service group data DS SG 2 intended for subscriber group 114 via network line 128 and for subscriber group 118 via network line 130, in an amount similar to DS SG 2 on downstream service group communication channel 318 as shown in arrow 404 from above in FIG. 4. Similarly, suppose for purposes of discussion, that originally, line 718 is providing upstream network access data from subscriber group 106 via network line 124 and from subscriber group 110 via network line 126 in an amount similar to US SG 1 on upstream service group communication channel 328 as shown in arrow 414 from above in FIG. 4, whereas line 720 is providing network access data from subscriber group 114 via network line 128 and from subscriber group 118 via network line 130 in an amount similar to US SG 2 on upstream service group communication channel 330 as shown in arrow 416 from above in FIG. 4.

Clearly, as shown in FIG. 4, the amount of network access data handled by line 706 is much larger than the amount of network access data handled by line 708 and the amount of network access data handled by line 718 is much larger than the amount of network access data handled by line 720.

In some embodiments, the broadband data provider facility may instruct network access device 704 redistribute the amount of network access data handled be line 706 and line 708 and redistribute the amount of network access data handled by line 718 and line 720. In other embodiments, network access device 704 may determine to perform load balancing without instructions from the broadband data provider facility. This will be described with reference to FIG. 9.

Figure 9:
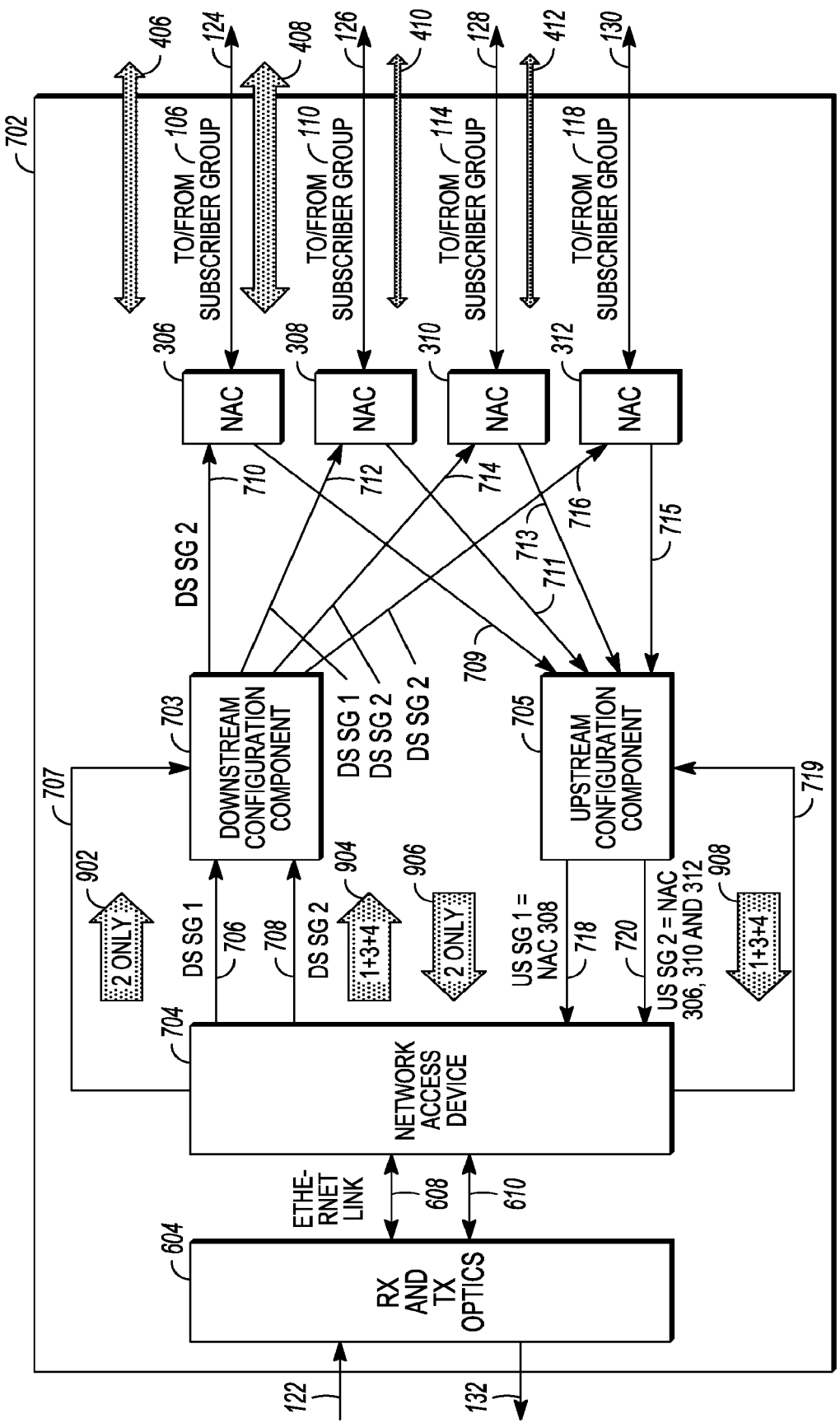
FIG. 9 illustrates the network node of FIG. 7 redistributing network access data in accordance with aspects of the present disclosure.

FIG. 9 illustrates the network node of FIG. 7 redistributing network access data in accordance with aspects of the present disclosure.

As shown in FIG. 9, network access device 704 has redistributed the amount of network access data handled by line 706 and line 708 and redistributed the amount of network access data handled by line 718 and line 720. In particular, in contrast with the data distribution similar to that of FIG. 4, line 706 in FIG. 9 is now providing downstream network access data in an amount represented by arrow 902 intended for subscriber group 110 via network line 126 only, whereas line 708 is now providing downstream network access data in an amount represented by arrow 904 intended for subscriber group 106 via network line 124, for subscriber group 114 via network line 128 and for subscriber group 118 via network line 130.

Similarly, in contrast with the data distribution similar to that of FIG. 4, line 718 in FIG. 9 is now providing upstream network access data in an amount represented by arrow 906 from subscriber group 110 via network line 126 only, whereas line 720 is now providing upstream network access data in an amount represented by arrow 908 from subscriber group 106 via network line 124, from subscriber group 114 via network line 128 and from subscriber group 118 via network line 130.

Network access device 704 additionally provides a configuration instruction to downstream configuration component 703 via line 707. In this example, the configuration instruction instructs downstream configuration component 703 to transmit the network access data from DS SG 1 to NAC 308 by way of line 712 for transmission to subscriber group 110 by way of network line 126. The configuration instruction additionally instructs downstream configuration component 703 to transmit the network access data from DS SG 2: to NAC 306 by way of line 710 for transmission to subscriber group 106 by way of network line 124; to NAC 310 by way of line 714 for transmission to subscriber group 114 by way of network line 128; and to NAC 312 by way of line 716 for transmission to subscriber group 118 by way of network line 130.

Further, network access device 704 additionally provides a configuration instruction to upstream configuration component 705 via line 719. In this example, the configuration instruction instructs upstream configuration component 705 to transmit the upstream network access data from subscriber group 110 by way of network line 126, NAC 308 and line 711 to US SG 1. The configuration instruction additionally instructs upstream configuration component 705: to transmit the upstream network access data from subscriber group 106 by way of network line 124, NAC 306 and line 709 to US SG 2; to transmit the upstream network access data from subscriber group 114 by way of network line 128, NAC 310 and line 713 to US SG 2; and to transmit the upstream network access data from subscriber group 118 by way of network line 130, NAC 312 and line 715 to US SG 2.

Any load balancing that might be required on the Ethernet links between the broadband data provider facility and the network access device is handled by standardized protocols such as IEEE 802.3 Link Aggregation (LAG).

Further, there may be instances where resources associated with a service group are disabled due to malfunction or to optimize the system such as reduced power consumption. In one instance, if aggregate data across all subscriber groups is sufficiently low, it might be beneficial to completely turn off resources associated with one service group and supply all subscriber groups with the other service group. In another instance, resources with one service group may malfunction and the subscriber groups associated with that service group are moved to the other service group for continued operation despite a failed component. This will be described in greater detail with reference to FIG. 10.

Figure 10:
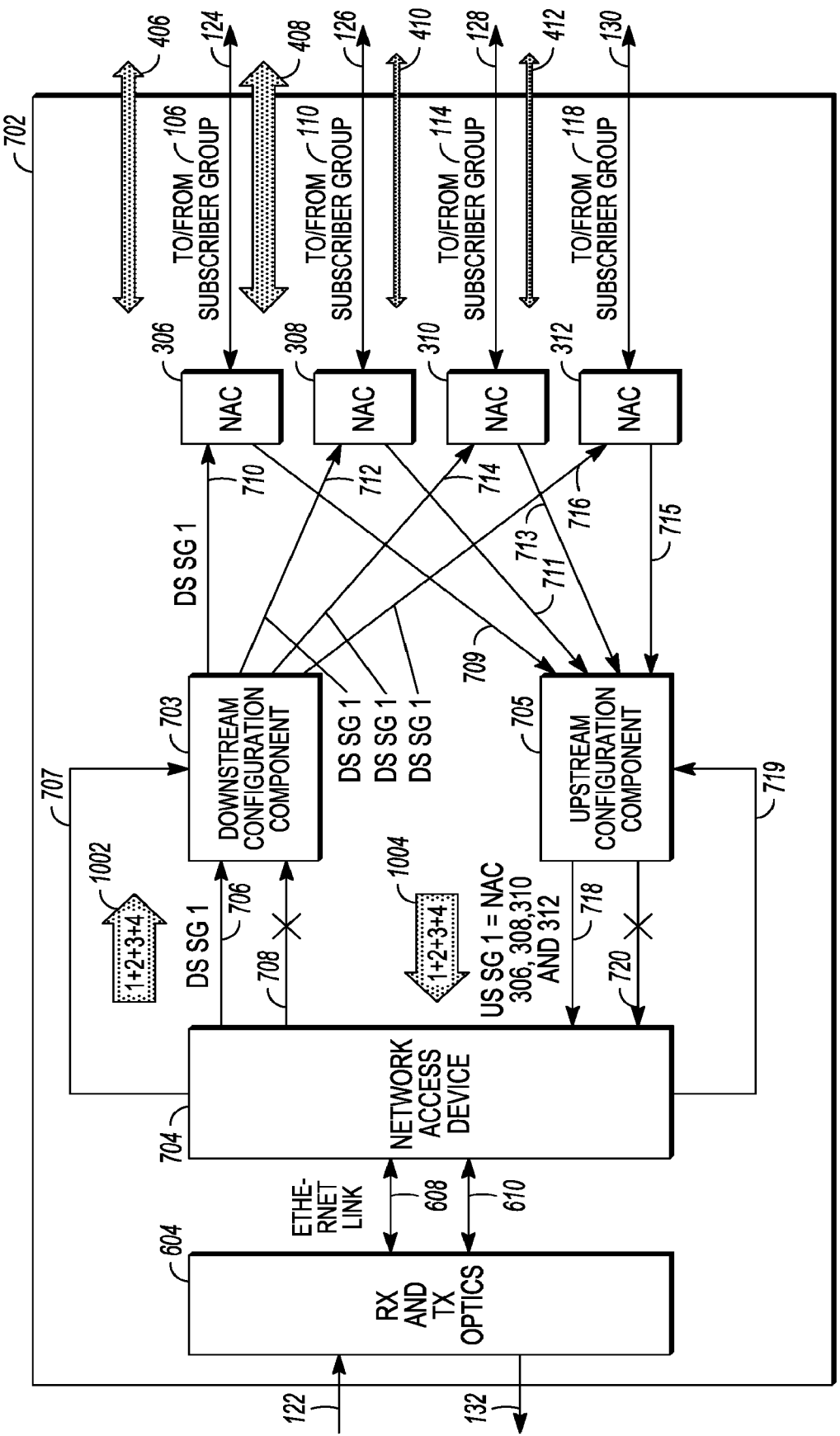
FIG. 10 illustrates the network node of FIG. 7 wherein network access data is redistributed to a single service group in accordance with aspects of the present disclosure.

FIG. 10 illustrates the network node 702 of FIG. 7 wherein network access data is redistributed to a single service group in accordance with aspects of the present disclosure.

In contrast with the situation as shown in FIG. 9, in FIG. 10, network access device 704 has redistributed the network access data such that all of the network access downstream data is handled by line 706 and all of the network access upstream data is handled be line 718. In this example, line 706 is now providing downstream network access data in an amount represented by arrow 1002 intended for subscriber group 106 via network line 124, for subscriber group 110 via network line 126, for subscriber group 114 via network line 128 and for subscriber group 118 via network line 130. Similarly, line 718 is now providing upstream network access data in an amount represented by arrow 1004 from subscriber group 106 via network line 124, from subscriber group 110 via network line 126, from subscriber group 114 via network line 128 and from subscriber group 118 via network line 130.

Network access device 704 additionally provides a configuration instruction to downstream configuration component 703 via line 707. In this example, the configuration instruction instructs downstream configuration component 703 to transmit the downstream network access data from DS SG 1: to NAC 306 by way of line 710 for transmission to subscriber group 106 by way of network line 124; to NAC 308 by way of line 712 for transmission to subscriber group 110 by way of network line 126; to NAC 310 by way of line 714 for transmission to subscriber group 114 by way of network line 128; and to NAC 312 by way of line 716 for transmission to subscriber group 118 by way of network line 130.

Further, network access device 704 additionally provides a configuration instruction to upstream configuration component 705 via line 719. In this example, the configuration instruction instructs upstream configuration component 705: to transmit the upstream network access data from subscriber group 106 by way of network line 124, NAC 306 and line 709 to US SG 1; to transmit the upstream network access data from subscriber group 110 by way of network line 126, NAC 308 and line 711 to US SG 1; to transmit the upstream network access data from subscriber group 114 by way of network line 128, NAC 310 and line 713 to US SG 1; and to transmit the upstream network access data from subscriber group 118 by way of network line 130, NAC 312 and line 715 to US SG 1.

As mentioned above with reference to FIG. 10, this type of total redistribution may be performed to save network resources such as reduced power. Further, as will be mentioned below, this type of total redistribution may be performed in the event that parts of network access device 704 becomes faulty.

A more detailed discussion of network access device 704 redistributing network access data will be described in greater detail with reference to FIGS. 11A-B.

Figure 11A:
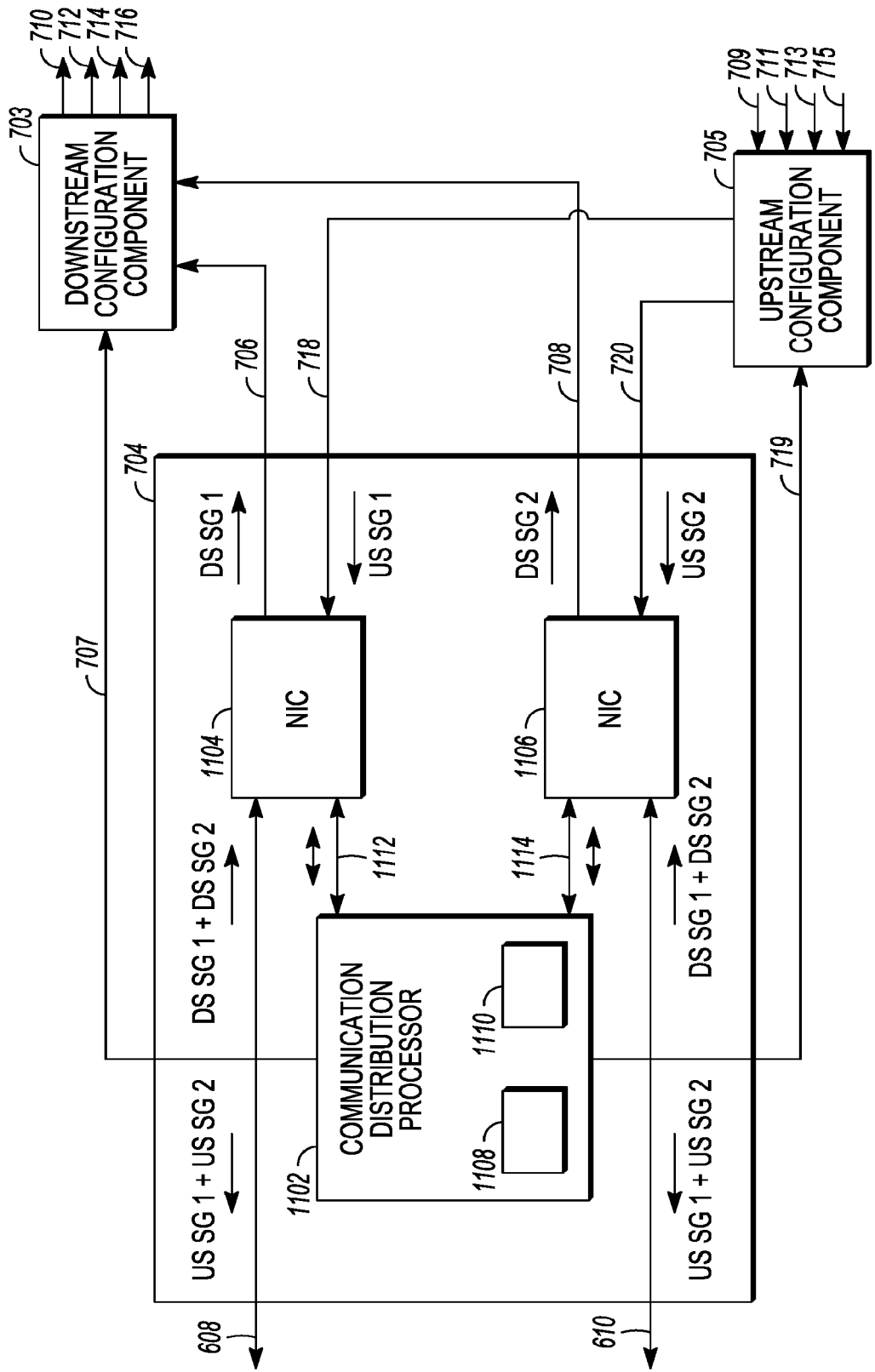
FIG. 11A illustrates an exploded view of the network access device of FIG. 7 in accordance with aspects of the present disclosure.
Figure 11B:
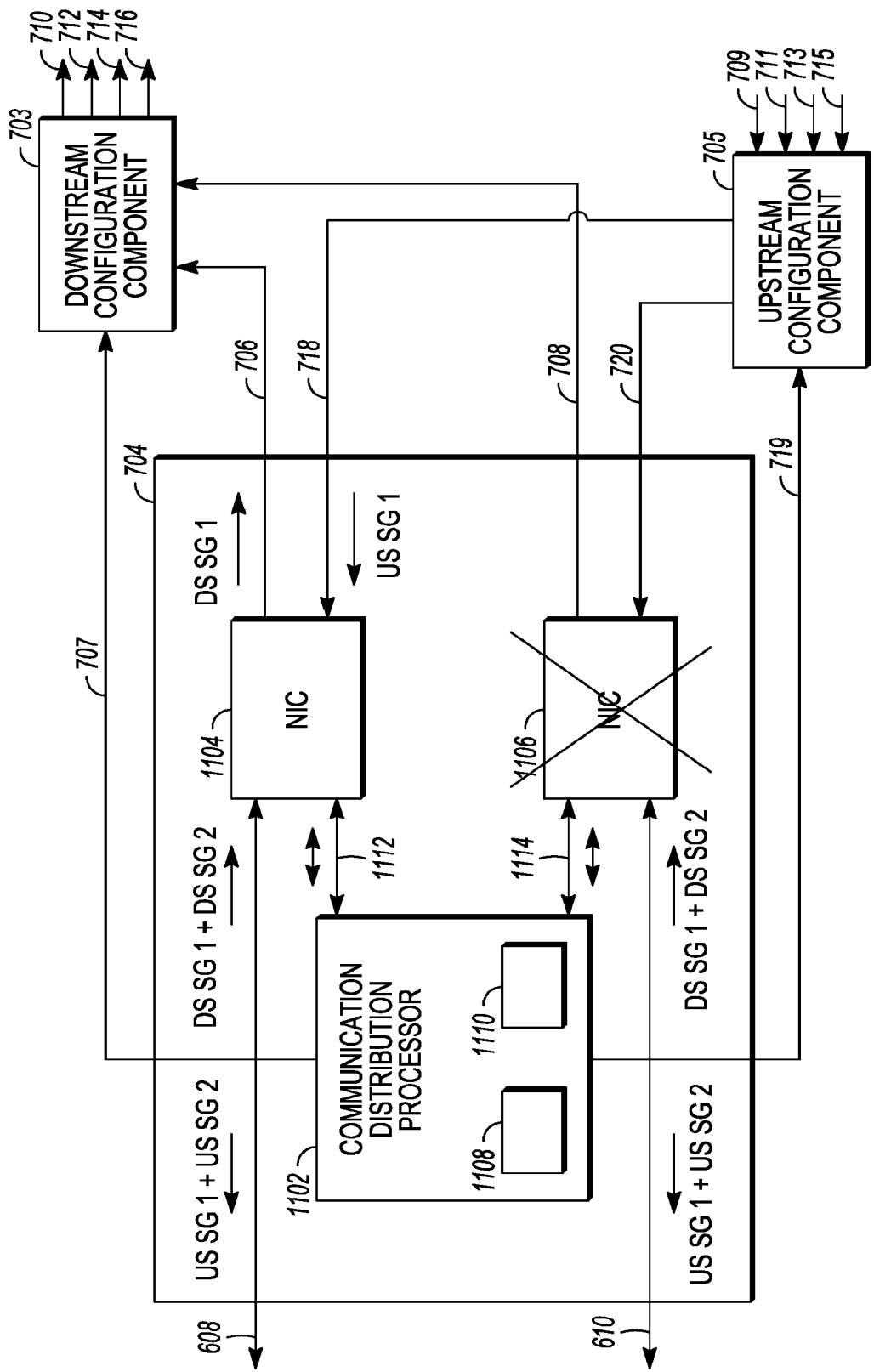
FIG. 11B illustrates an exploded view of the network access device of FIG. 7 redistributing network access data in accordance with aspects of the present disclosure.

FIG. 11A illustrates network access device 704 with multiple network interface components (NICs) in accordance with aspects of the present disclosure.

As shown in FIG. 11A, network access device 704 includes a communication distribution processor 1102, a NIC 1104, and a NIC 1106. Communication distribution processor 1102 further includes a communication component 1108 and a control component 1110.

In this example, communication distribution processor 1102, NIC 1104, NIC 1106, communication component 1108, and control component 1110 are illustrated as individual devices. However, in some embodiments, at least two of communication distribution processor 1102, NIC 1104, NIC 1106, communication component 1108, and control component 1110 may be combined as a unitary device. Further, in some embodiments, at least one of communication distribution processor 1102, NIC 1104, NIC 1106, communication component 1108, and control component 1110 may be implemented as a computer having tangible computer-readable media for carrying or having computer-executable instructions or data structures stored thereon. In one embodiment, the communication distribution processor 1102 may perform additional processing such as parts of the DOCSIS CMTS PHY and the CMTS MAC processing.

NIC 1104 is a network interface component that is operable to convert a first service group provider data into a first service group network access data. It also forwards communication from the broadband service provider facility via line 608 with communication distribution processor 1102 via line 1112. NIC 1106 is also a network interface component that is operable to convert a second service group provider data into a second service group network access data. It also forwards communication from the broadband service provider facility via line 610 with communication distribution processor 1102 via line 1114. In one embodiment, a NIC may perform additional processing such as parts of the DOCSIS CMTS PHY and the CMTS MAC processing.

Communication component 1108 may be any device or system that is operable to: receive and transmit data for the broadband data provider facility via NIC 1104 on line 1112 and via NIC 1106 on line 1114; receive and transmit a first service group provider data with NIC 1104 on line 1112, as will be described in greater detail below; receive and transmit a second service group provider data from NIC 1106 on line 1114, as will be described in greater detail below; receive a configuration instruction from a broadband data provider facility, as will be described in greater detail below;

and receive a second configuration instruction from a broadband data provider facility, as will be described in greater detail below.

Control component 1110 may be any device or system that is operable to: generate the configuration instruction to instruct NIC 1104 to provide the first service group network access data to downstream configuration component 703, as will be described in greater detail below; instruct NIC 1106 to provide the second service group network access data to downstream configuration component 703, as will be described in greater detail below; instruct downstream configuration component 703, based on the configuration instruction, to provide the first service group network access data to a first subscriber group and to provide the second service group network access data to a second subscriber group, as will be described in greater detail below; instruct downstream configuration component 703, based on the second configuration instruction, to provide the first service group network access data to a first subscriber group and to provide the second service group network access data to a second subscriber group, as will be described in greater detail below.

In operation, for purposes of discussion, suppose that network node 702 has just received downstream broadband provider data for DS SG 1 and DS SG 2 as well as a configuration instruction from a broadband data provider facility as a single optical signal with multiple wavelengths to network node 702. The signal is received by communication component 604 and is then transmitted to NIC 1104 of network access device 704 via Ethernet link 608 and to NIC 1106 of network access device 704 via Ethernet link 610.

As shown in the figure, Ethernet link 608, line 1112, line 1114 and Ethernet link 610 are all Ethernet channels, whereas 706-708 and 718-720 are all RF channels.

Broadband provider data for DS SG 1 and DS SG 2 as well as the configuration instruction in some cases may be dispersed between line 608 and line 610 such that each of NIC 1104 and NIC 1106 receives respective portions of broadband provider data for DS SG 1 and DS SG 2. NIC 1104 then forwards the broadband provider data for DS SG 1 and DS SG 2 as well as the configuration instruction it received via Ethernet link 608 to communication distribution processor 1102 via line 1112. Similarly, NIC 1106 then also forwards the broadband provider data from DS SG 1 and DS SG 2 as well as the configuration instruction it received via Ethernet link 610 to communication distribution processor 1102 via line 1114.

Communication component 1108 may provide some or all CMTS MAC functionality to 1102, thus transforming network access device 704 from a RPD to a RMD. Media access control (MAC) is a sublayer of the data link layer (DLL) in the seven-layer OSI network reference model. MAC is responsible for the transmission of data packets to and from the network-interface card, and to and from another remotely shared channel. It is the MAC functionality that enables the redistribution of network access data traffic. Without the MAC functionality in network access device 704, any redistribution of network access data traffic must be provided from the broadband data provider facility.

Communication component 1108 manages receipt of data from NIC 1104 and NIC 1106 and manages transmission of data back to NIC 1104 and NIC 1106. In the event that communication distribution processor 1102 does not receive data from NIC 1104, then communication component 1108 would instruct control component 1110 that NIC 1104 has failed. Similarly, in the event that communication distribution processor 1102 does not receive data from NIC 1106, then then communication component 1108 would instruct control component 1110 that NIC 1106 has failed.

With the downstream broadband provider data for DS SG 1 and DS SG 2 and configuration instructions received from NIC 1104 and NIC 1106, communication component 1108 processes the broadband provider data including the MAC functionality and separates the combination of DS SG 1 and DS SG 2. Communication component 1108 then generates downstream service group data for DS SG1 to send to NIC 1104 and downstream service group data for DS SG2 to send to NIC 1106. Communication distribution processor 1102 will then use the configuration instruction to configure each of NIC 1104, NIC 1106, downstream configuration component 703, and upstream configuration component 705.

Once the downstream service group data is received from communication distribution processor 1102 via line 1112, NIC 1104 processes the data including the CMTS PHY functions, and then generates the service group network access data to send to downstream configuration component 703 via line 706. Similarly, once the downstream service group data is received from communication distribution processor 1102 via line 1114, NIC 1106 processes the data including the CMTS PHY functions, and then generates the service group network access data to send to downstream configuration component 703 via line 708.

In this example embodiment, communication distribution processor 1102 provides the configuration instruction to downstream configuration component 703 via line 707 and provides the configuration instruction to upstream configuration component 705 via line 719. The configuration instruction instructs downstream configuration component 703 as to how downstream configuration component 703 should deliver network access data to each of NAC 306, NAC 308, NAC 310, and NAC 312 of FIG. 7. The configuration instruction further instructs upstream configuration component 705 that upstream configuration component 705 should deliver subscriber group access data that upstream configuration component 705 receives that corresponds to US SG 1 to NIC 1104 and that upstream configuration component 705 should transmit subscriber group access data that upstream configuration component 705 receives that corresponds to US SG 2 to NIC 1106.

The operation of downstream configuration component 705 delivering data from different service groups to different subscriber groups has been discussed in multiple previous embodiments, and for purposes of brevity, will not be described again here. Similarly, the operation of upstream configuration component delivering data from different subscriber groups to different service groups has been discussed in multiple previous embodiments, and for purposes of brevity, will not be described again here.

Once received, communication distribution processor 1102 will transmit the configuration instruction to NIC 1104 via line 1112, NIC 1106 via line 1114, downstream configuration component 703 via line 707, and upstream configuration component 705 via line 719. Once received, NIC 1104 will transmit service group network access data for DS SG 1 as an RF signal to downstream configuration component 703 via line 706 and NIC 1106 will transmit the service group network access data for DS SG 2 to downstream configuration component 703 via line 708. Downstream configuration component 703 will then transmit the data to the subscriber groups based on the received configuration instruction as described above.

Simultaneously, upstream network access data from the subscriber groups is received by each NAC 306, NAC 308, NAC 310, and NAC 312 of FIG. 7 and then is received by upstream configuration component 705. Upstream configuration component 705 then transmits the upstream service group network access data corresponding to US SG 1 to NIC 1104 via line 718 and upstream service group network access data corresponding to US SG 2 to NIC 1106 via line 720. NIC 1104 processes the data including the CMTS PHY functions, and then transmit the US SG 1 service group data to communication distribution processor 1102 via line 1112 for additional processing including MAC functionality. NIC 1106 processes the data including the CMTS PHY functions, and then transmit the US SG 2 service group data to communication distribution processor 1102 via line 1114 for additional processing including MAC functionality. After communication component 1108 processes the subscriber group upstream data from NIC 1104 and NIC 1106, it sends the resulting broadband provider data to the broadband data provider facility using line 608 via NIC 1104 and line 1112 and using line 610 via NIC 1106 and line 1114. In some cases, upstream broadband provider data for DS SG 1 and DS SG 2 may be dispersed between line 608 and line 610.

Simultaneously, upstream network access data from the subscriber groups is received by each NAC 306, NAC 308, NAC 310, and NAC 312 of FIG. 7 and then is received by upstream configuration component 705. Upstream configuration component 705 then transmits the data corresponding to US SG 1 to NIC 1104 via line 718 and data corresponding to US SG 2 to NIC 1106 via line 720. NIC 1104 may transmit the US SG 1 data to communication distribution processor 1102 via line 1112 for additional processing including MAC functionality. NIC 1106 may transmit the US SG 2 data to communication distribution processor 1102 via line 1114 for additional processing including MAC functionality. Once the subscriber group upstream data returns to the NIC and is ready to go to the broadband data provider facility, NIC 1104 then transmits the data to communication component 604 via line 608 and NIC 1106 transmits the data to communication component 604 via line 610.

Know that network access device 704 monitors the traffic load of each subscriber group. Suppose that each subscriber group is using very little data and it is determined that the total amount of traffic could be handled by a single service group such as NIC 1104. Using this determination, network access device 704 can then redistribute the network access data. This was discussed above in FIG. 10, but now will be discussed in more detail within network access device 704 redistributing network access data with reference to FIG. 11B.

In operation, communication distribution processor 1102 monitors the traffic load of each subscriber group as described above in FIG. 9. Communication distribution processor 1102 then determines that a single service group could handle the entire traffic load and that the network access data should be redistributed. In this embodiment, control component 1110 generates a new configuration instruction which it will then transmit to each of NIC 1104, NIC 1106, downstream configuration component 703, and upstream configuration component 705. The configuration instruction will inform each component that NIC 1104 should begin handling all of the broadband provider data traffic of network node 702.

At this time, NIC 1106 stops operation and no longer transmits any data to downstream configuration component 703. Simultaneously, NIC 1104 will transmit all of the downstream broadband provider data corresponding to DS SG 1 to downstream configuration component 703. Downstream configuration component 703 will then transmit the data to each of NAC 306, NAC 308, NAC 310, and NAC 312 of FIG. 7 based on the new configuration instruction.

Upstream data transmit by each of the subscriber groups to NAC 306, NAC 308, NAC 310, and NAC 312 is received by upstream configuration component 705. Based on the new configuration instruction, upstream configuration component 705 stops transmitting any data to NIC 1106 and proceeds to send the upstream data from all subscriber groups to US SG 1 to NIC 1104 via line 718. Once received, NIC 1104 will process and transmit the upstream data as described above.

The above discussion with reference to the redistribution of resources (S810 of FIG. 8), details the remote redistribution functionality of network access device 704 of network node 702 in accordance with aspects of the present disclosure.

In the prior art network systems discussed above with reference to FIGS. 3A-4 and 6, if a network node were to fail such that a service group was no longer provided, then the affected service groups would be out of service until a technician could travel to and physically replace the faulty network node. Further, in the prior art network systems discussed above with reference to FIGS. 3A-4 and 6, if traffic loads associated with different service groups were badly unbalanced, there was no way to redistribute the traffic loads without a technician traveling to and physically replacing the network node or just the downstream and upstream configuration components with a new one having different configurations.

In contrast with the prior art systems, the remote redistribution functionality of network access device 704 of network node 702 in accordance with aspects of the present disclosure enable the network access device 704 to remotely and dynamically redistribute the traffic loads as needed to balance service groups or operate in reduced power mode, or in the event that certain aspects of network access device 704 becomes faulty.

Returning to FIG. 8, if it is determined that redistribution of network access data is not required (N at S808), devices are monitored (S812). In an example embodiment, devices and components within network node 702 are monitored for correct operation.

It is then determined whether some part of network access device 704 has malfunctioned (S814). This will be described in greater detail with reference to FIGS. 12 and 13.

Figure 12:
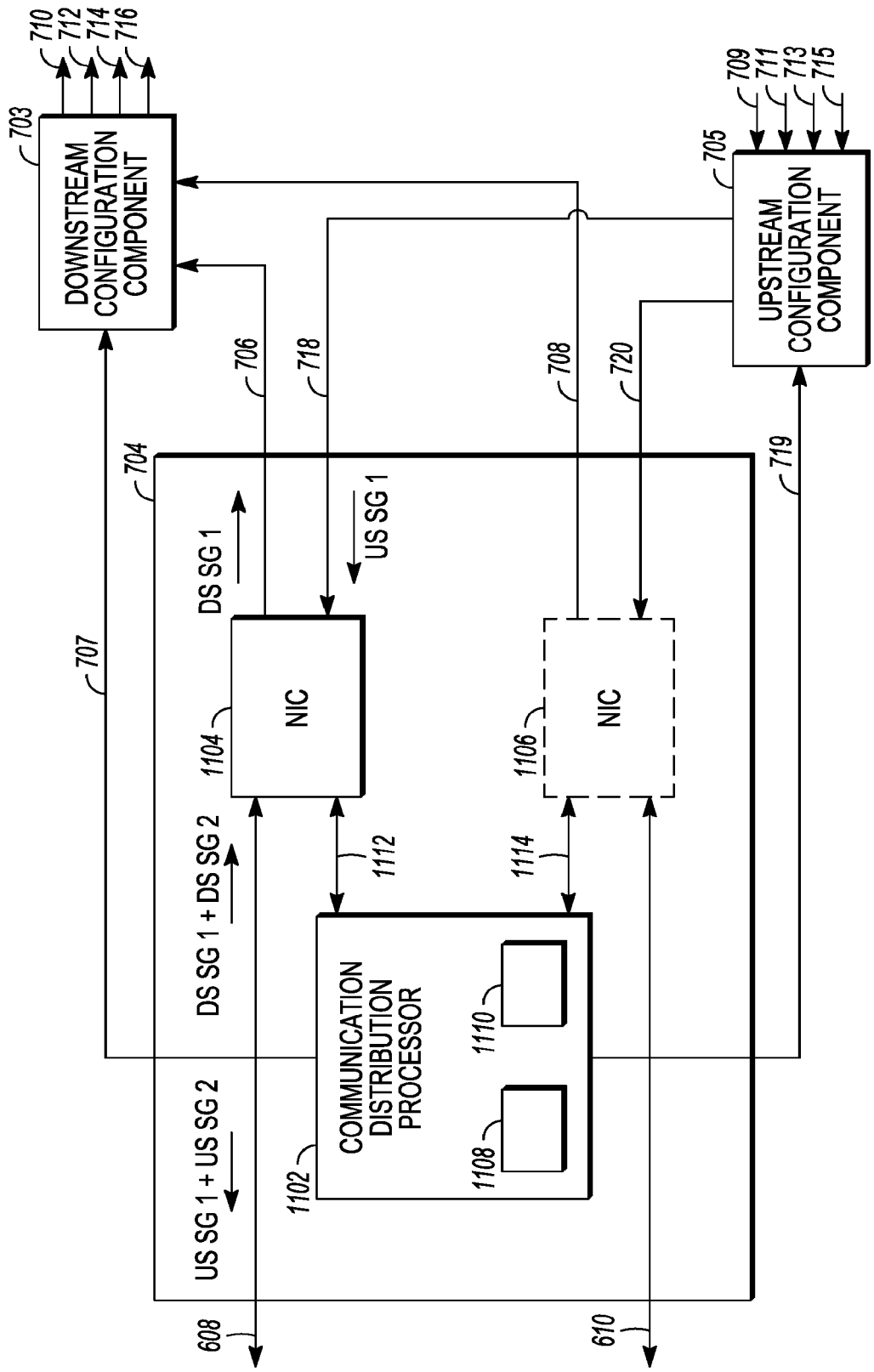
FIG. 12 illustrates the network access device of FIG. 7 redistributing network access data in accordance with aspects of the present disclosure.

FIG. 12 illustrates a situation in which one of the NICs within network access device 704 fails. As shown in the figure, in this example situation, NIC 1106 has failed, as indicated by the dotted box.

With a failure of NIC 1106, communication distribution processor 1102 does not receive data from NIC 1106. As mentioned above, such a lack of communication would indicate to communication distribution processor 1102 that NIC 1106 has failed.

In this example, NIC 1106 is initially responsible for transmitting the data corresponding to DS SG 2 to subscriber group three and to subscriber group four. However, if NIC 1106 is not functioning, then subscriber group three and subscriber group four would not have any service at all.

However, in accordance with aspects of the present disclosure, communication distribution processor 1102 determines that NIC 1106 has failed.

Returning to FIG. 8, in the event that one of NIC 1104 or NIC 1106 fails (Y at S814), but the other of NIC 1104 or NIC 1106 continues to operate properly and communication distribution processor 1102 continues to operate properly, this would be a partial failure of network access device 704 (Y at S818). This is a partial failure because communication distribution processor 1102 may still manage to distribute the network access data through at least one NIC (S820). This may be accomplished in a manner as discussed above (S810).

At this point, network access device 704 may be operated in a manner similar to that discussed above with reference to FIG. 10. The difference here being that as shown in FIG. 12, NIC 1106 has failed to properly operate, whereas in the example discussed above with reference to FIG. 10, the second service group was purposely deactivated to save resources such as power consumption.

Further, it may be possible that communication distribution processor 1102 fails. Returning to FIG. 8, this situation might mean a total malfunction (N at S818). This will be described with additional reference to FIG. 13.

Figure 13:
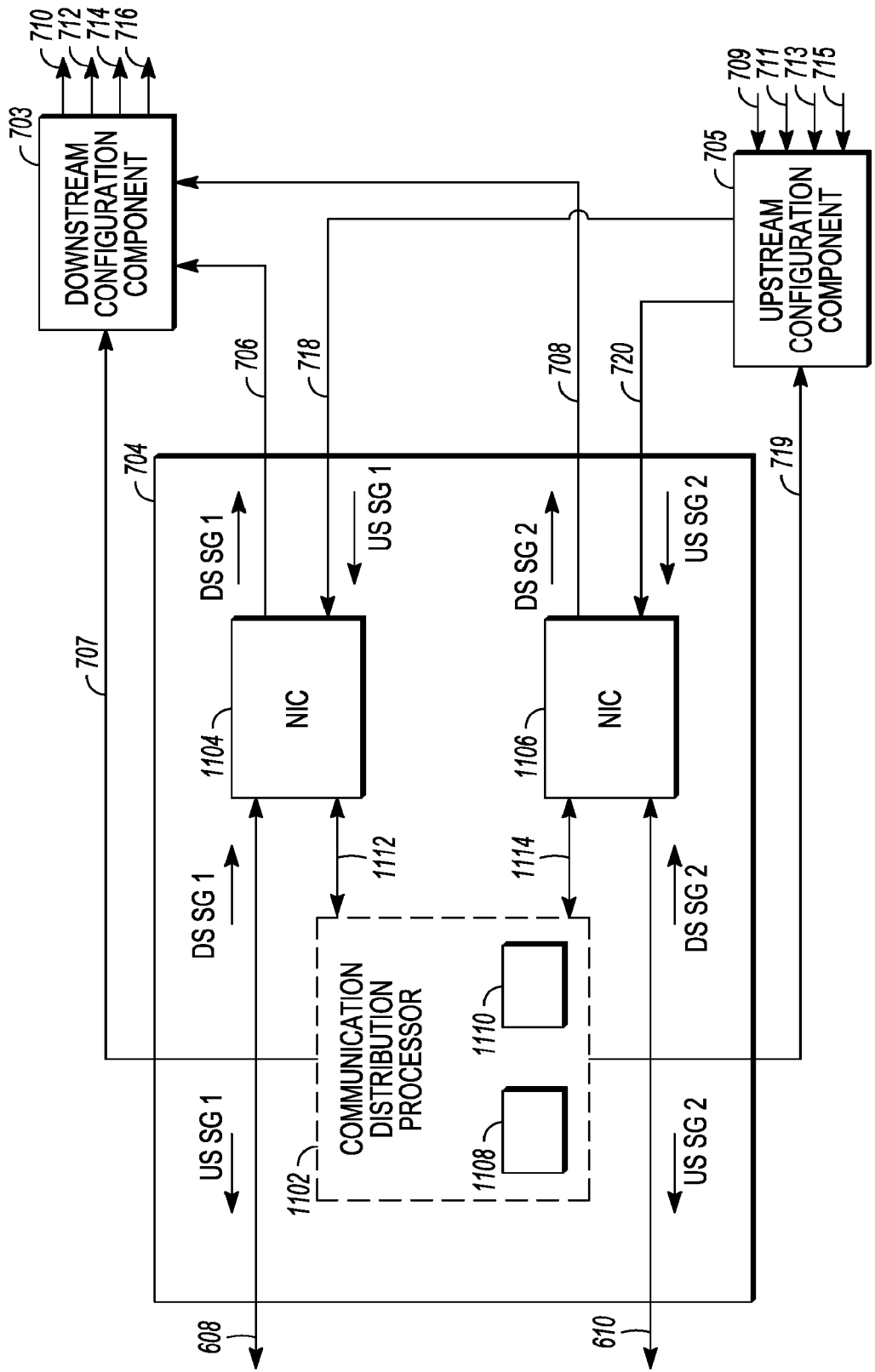
FIG. 13 illustrates a network access device of FIG. 7 redistributing network access data in accordance with aspects of the present disclosure.

FIG. 13 illustrates a situation in which communication distribution processor 1102 within network access device 704 fails, as indicated by the dotted box.

With a failure of communication distribution processor 1102, NIC 1104 does not receive data from communication distribution processor 1102 via line 1112 and NIC 1106 does not receive data from communication distribution processor 1102 via line 1114. This lack of communication would indicate to NIC 1104 and to NIC 1106 that communication distribution processor 1102 has failed.

Presume, for purposes of discussion that in this example, prior to communication distribution processor 102 becoming faulty, communication distribution processor 102 had redistributed the network access data according to FIG. 9 discussed above such that NIC 1104 was responsible for transmitting the data corresponding to DS SG 1 to subscriber group 110, whereas NIC 1106 responsible for transmitting the data corresponding to DS SG 2 to subscriber group 106, to subscriber group 114 and to subscriber group 118.

In particular, communication distribution processor 1102 provided a configuration instruction to downstream configuration component 703 via line 707 so as to instruct downstream configuration component 703 to provide the DS SG 1 network access data from NIC 1104 to line 712 and to provide the DS SG 2 network access data from NIC 1106 to lines 710, 714 and 716. Similarly, communication distribution processor 1102 provided a configuration instruction to upstream configuration component 705 via line 719 so as to instruct upstream configuration component 705 to provide the network access data from line 711 to NIC 1104 via line 718 as US SG 1 network access data and to provide the network access data from lines 709, 713, and 715 to NIC 1106 via line 720 as US SG 2 network access data.

Returning to FIG. 8, if there is a total malfunction in network access device 704 (N at S818), then the networks access data is allocated to the original distribution (S824). In accordance with aspects of the present disclosure, when communication distribution processor 1102 fails, configuration instructions are no longer provided to downstream configuration component 703 or upstream configuration component 705.

Therefore, if communication distribution processor 1102 fails, then downstream configuration component 703 and upstream configuration component 705 are configured in a default mode wherein, NIC 1104 is responsible for transmitting the data corresponding to DS SG 1 to subscriber group 106 and to subscriber group 110, whereas NIC 1106 responsible for transmitting the data corresponding to DS SG 2 to subscriber group 114 and to subscriber group 118. In another embodiment, downstream configuration component 703 and upstream configuration component 705 could stay locked in the current configuration until the communication distribution processor 1102 is fixed or replaced by functions in the broadband data provider facility.

In particular, downstream configuration component 703 provides the DS SG 1 network access data from NIC 1104 to lines 710 and 712 and provides the DS SG 2 network access data from NIC 1106 to lines 714 and 716. Similarly, upstream configuration component 705 provide the upstream network access data from lines 709 and 711 to NIC 1104 via line 718 as US SG 1 network access data and provide the upstream network access data from lines 713, and 715 to NIC 1106 via line 720 as US SG 2 network access data.

Returning to FIG. 8, after the network access data has been reassigned to the original resources (S824), the faulty network access device may be replaced (S822).

At this point, network access device 704 may be operated in a manner similar to the prior art system discussed above with reference to FIG. 6. Network access device 704 may have been acting as a Remote MAC-PHY device (RMD). While communication distribution processor 1102 is down, it may not be able to do all of the CMTS MAC processing functions within the network node 702 and fall back to Remote PHY device (RPD) operation with the broadband data provider facility providing the MAC Core processing. While communication distribution processor 1102 is down, network access device 704 is unable to redistribute the network access data. However, while communication distribution processor 1102 is down, network access device 704 no longer has a remote redistribution functionality but may still provide service to all subscriber groups in a manner similar to a properly functioning conventional network node 602 discussed above with reference to FIG. 6, until a technician can visit the site and replace communication distribution processor 1102 or network access device 704 as a whole.

Returning to FIG. 8, after the faulty network access device is replaced (S822), method 800 stops (S816). Further, if no malfunctions are detected (N at S814), network node 702 will continue operating in its current state until method 800 stops (S816).

In the example embodiment discussed above with reference to FIGS. 10, network access device 704 is able to operate in a 2×2 configuration, meaning there are two downstream service groups and two upstream service groups and is further operable to convert to a 1×1 configuration. In the example embodiment discussed above with reference to FIG. 13, network access device 704 is able to operate in a 2×2 configuration having remote redistribution functionality that is operable to convert to a 2×2 configuration without remote redistribution functionality.

In still other embodiments, a network access device in accordance with aspects of the present disclosure may be used as a 1×1 configuration having remote redistribution functionality and with DOCSIS PHY layer full duplex capability. This will be described in greater detail with reference to FIG. 14.

Figure 14:
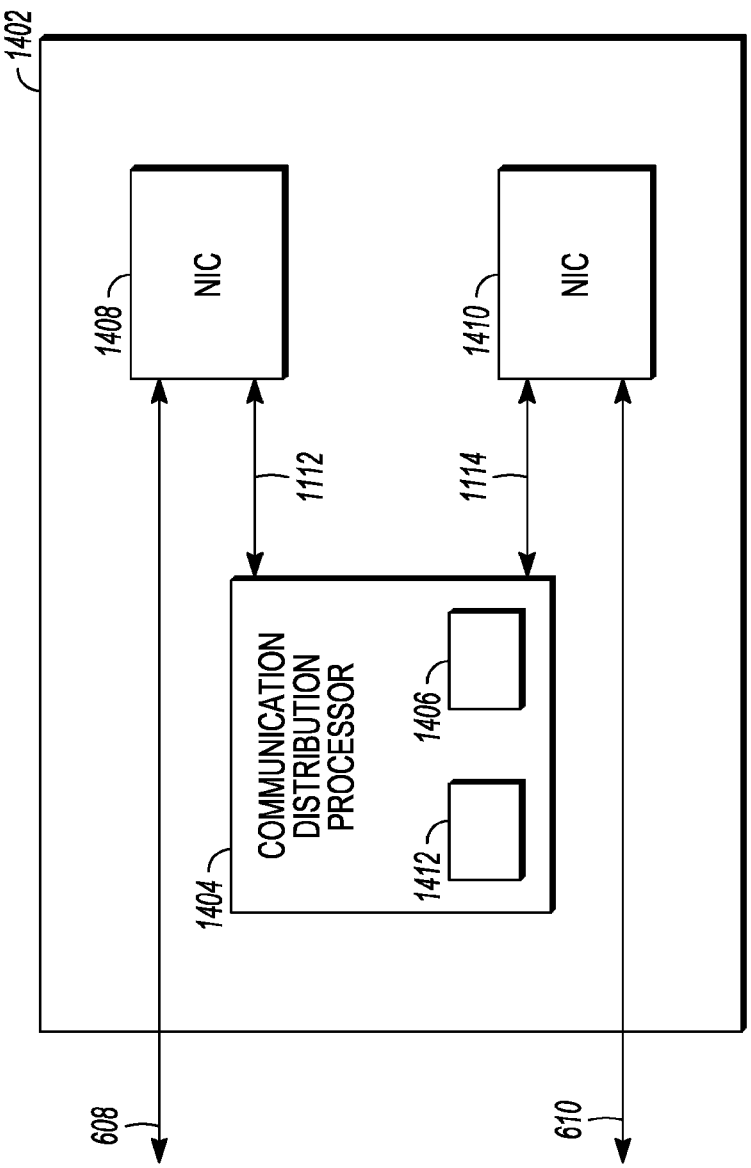
FIG. 14 illustrates another example embodiment of a network access device in accordance with aspects of the present disclosure.

FIG. 14 illustrates another example embodiment of a network access device 1402 in accordance with aspects of the present disclosure.

As shown in the figure, network access device 1402 is similar to network access device 704 as shown in FIG. 11A, wherein communication distribution processor 1102 has been replaced with communication distribution processor 1404; NIC 1104 has been replaced with NIC 1408; and NIC 1106 has been replaced with NIC 1410. Communication distribution processor 1404 differs from communication distribution processor 1102 in that control component 1110 of communication distribution processor 1102 has been replaced with control component 1406 and communication component 1108 of communication distribution processor 1102 has been replaced with communication component 1412.

Control component 1406 is able to perform the functionality of control component 1110 as discussed above, and communication component 1412 is able to perform the same functionality of communication component 1108 as discussed above. However, control component 1406 and communication component 1412 have additional functionality so as to enable communication distribution processor 1404, NIC 1408 and NIC 1410 to provide additional processing for DOCSIS PHY full duplex (FDX) capability. In this embodiment, the MAC functionality may not be performed in network access device 1402 if resources are limited, and the MAC functionality may be pushed up to a MAC core in the broadband data provider facility.

In this example embodiment, in the event of a malfunction, wherein communication distribution processor 1404 becomes faulty but each of NIC 1408 and NIC 1410 still function properly, network access device 1402 will default to operate in a manner similar to network access device 704 as discussed above with reference to FIG. 13. In particular, in the event of a communication distribution processor malfunction, network access device 1402 may be operated in a manner similar to the prior art system discussed above with reference to FIG. 6. While communication distribution processor 1402 is down, network access device 1402 may not be able to operate in a FDX mode. However, while communication distribution processor 1404 is down, network access device 1404 may act as an RPD without FDX and still provide service to all subscriber groups in a manner similar to a properly functioning conventional network node 602 discussed above with reference to FIG. 6, until a technician can visit the site and replace communication distribution processor 1404 or network access device 1402 as a whole.

Figure 15:
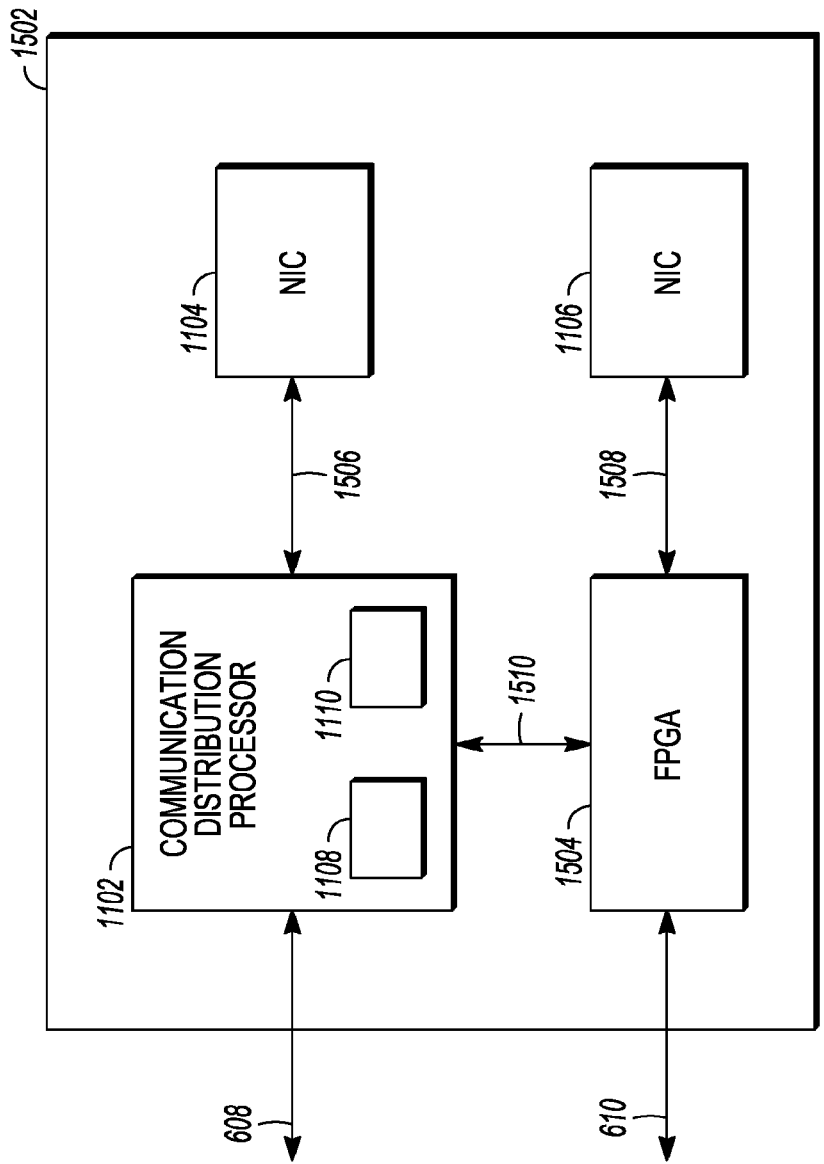
FIG. 15 illustrates another example embodiment of a network access device in accordance with aspects of the present disclosure.

FIG. 15 illustrates another example embodiment of a network access device 1502 in accordance with aspects of the present disclosure.

As shown in the figure, network access device 1502 includes communication distribution processor 1102, NIC 1104, NIC 1106 and a field programmable gate array (FPGA) 1504.

Communication distribution processor 1102 is connected directly to 608, whereas FPGA 1504 is connected to 610. Communication distribution processor 1102 is additionally arranged to output data to NIC 1104 via a line 1506. FPGA is additionally arranged to output data to NIC 1106 via a line 1508. Further FPGA 1504 and communication distribution processor 1102 are able to communicate via an Ethernet link 1510. The remaining arrangement of network access device 1502 as applied to a network node in accordance with aspects of the present disclosure are similar to network node 702 discussed above with reference to FIG. 7.

Broadband provider downstream data as well as the configuration instruction are received by communication distribution processor 1102 via Ethernet link 608. Broadband provider downstream data as well as the configuration instruction are additionally received by FPGA 1504 via Ethernet link 610. FPGA then passes the broadband provider downstream data as well as the configuration instruction to communication distribution processor 1102 via Ethernet link 1510.

Communication component 1108 manages receipt of broadband provider downstream data from Ethernet link 608 and from FPGA 1504 and manages transmission of DS SG 1 data to NIC 1104 via line 1506 and DS SG 2 data to NIC 1106 via FPGA 1504 and line 1508. Overall operation of network access device 1502 appears identical to previously discussed network access device 704 in FIG. 7-10 and network access device 1102 in FIG. 11-13. For example, if either NIC fails, communication distribution processor 1102 would route all broadband provider data for all subscriber groups onto a single service group associated with the functioning NIC.

In the event that communication distribution processor 1102 does not receive data from FPGA 1504, then communication component 1108 would instruct control component 1110 that FPGA 1504 has failed.

All broadband provider data would now go through Ethernet link 608. Since NIC 1106 is no longer accessible with FPGA 1504 failed, then all subscriber group data would go through NIC 1104. Downstream configuration component 703 and upstream configuration component 705 would receive appropriate instructions for the configuration change.

In the event that communication distribution processor 1102 fails, then network access device 1502 stops from functioning as a 2×2 configuration with remote redistribution functionality and operates as a 1×1 configuration without remote redistribution functionality. The network node may have also lost its MAC processing functionality and needs to revert to Remote PHY device (RPD) operation. The FPGA 1504 may provide additional functions necessary to allow NIC to connect to Ethernet link 610 and to operate as a RPD.

Figure 16:
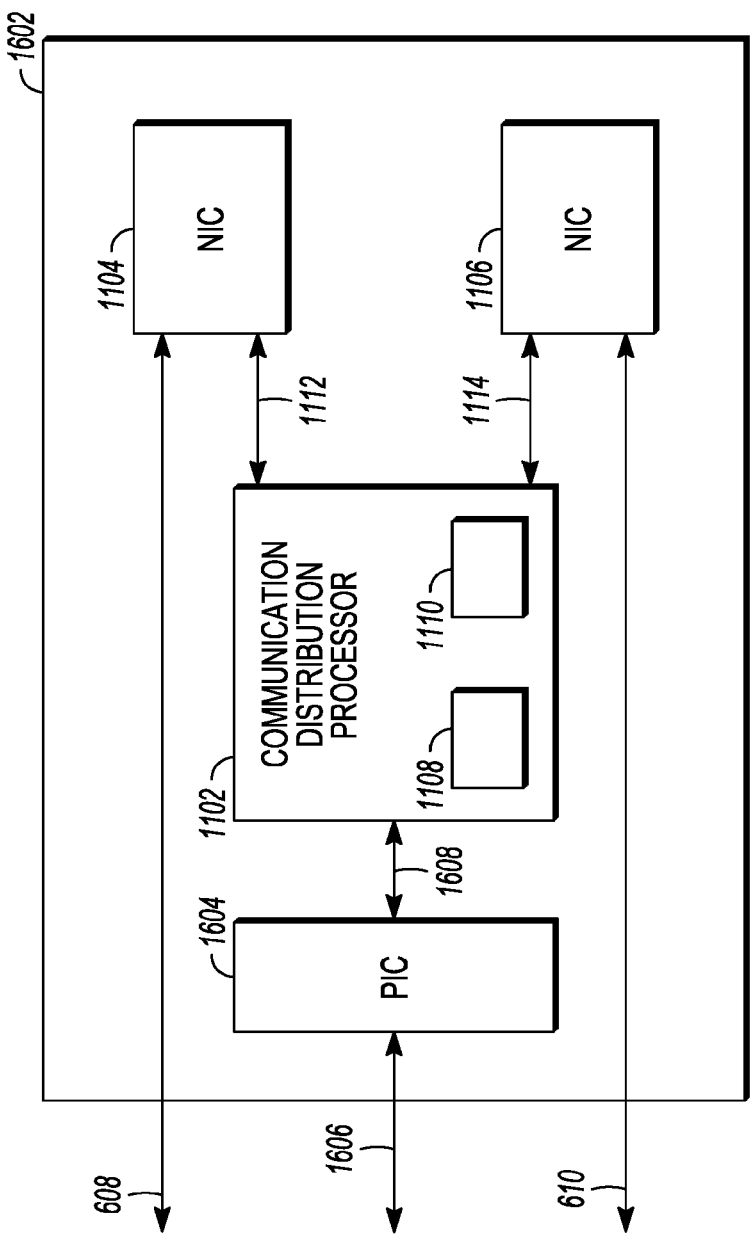
FIG. 16 illustrates another example embodiment of a network access device in accordance with aspects of the present disclosure.

FIG. 16 illustrates another example embodiment of a network access device 1602 in accordance with aspects of the present disclosure.

As shown in the figure, network access device 1602 is similar to network access device 704, but further includes a physical interface card (PIC) 1604.

PIC 1604 is arranged to receive optical signals via an Ethernet line 1606 and is arranged to communicate with communication distribution processor 1102 via an Ethernet link 1608.

PIC 1604 provides functionality similar to optical communication component 604 and further enables a plurality of known alternative interfaces. This modular component enables the network node to upgrade its network interface to higher speeds (e.g. from 10 Gbps to 40 Gbps and 100 Gbps interfaces) as well as different network technologies (e.g. PON in addition to Ethernet). Having more network interfaces also increases the versatility of the network node. In one embodiment, it would allow network nodes to be daisy chained together such that only one node has the expensive long-distance optics to the broadband data provider facility with the other daisy-chained network nodes having lower cost short distance optics. In another embodiment, the additional network interfaces allow a multitude of network nodes to be interconnected. This might result in various network architectures such as rings, mesh or partial-mesh architectures. These are well known in the industry and provides additional capacity and robustness to the system.

Figure 17:
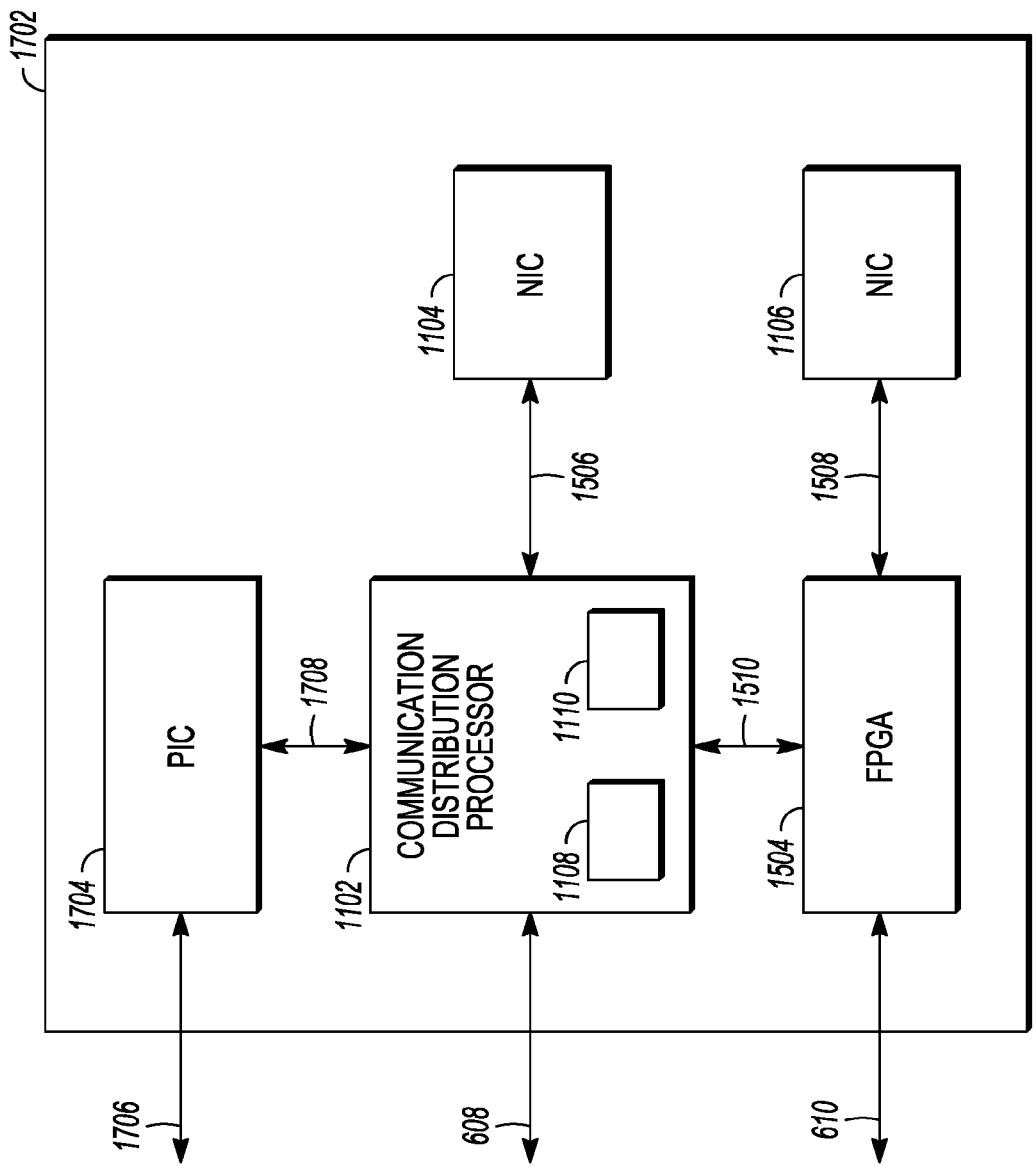
FIG. 17 illustrates another example embodiment of a network access device in accordance with aspects of the present disclosure.

FIG. 17 illustrates another example embodiment of a network access device 1702 in accordance with aspects of the present disclosure.

As shown in the figure, network access device 1702 is similar to network access device 1502, but further includes a physical interface card (PIC) 1704.

PIC 1704 is arranged to receive data via an Ethernet line 1706 and is arranged to communicate with communication distribution processor 1102 via an Ethernet link 1708.

PIC 1704 provides the same functionality and benefits as PIC 1604 just discussed.

It should be noted that a network node in accordance with aspects of the present disclosure may be used in a variety of different types of access networks. The description is primarily focused on a hybrid fiber-coaxial network wherein the network node generates the subscriber group access data as hybrid fiber-coaxial network data. The network node may also be used in a passive optical network wherein the network node generates the subscriber group access data as passive optical network data, and may be used in a wireless network wherein the network node generates the subscriber group access data as wireless network data.

In summary, a problem with the current system and methods of using network access devices in network nodes is that the systems are not flexible or adaptable. Current network nodes are hardwired, so if there is a failure of equipment in the service group or the network node itself, any serviced subscriber groups will be affected until a technician can replace or repair the physical hardware. Current network nodes are not capable of dynamically changing the subscriber group to service group mapping to effectively load balance the system between the service groups or to shut down one of the service group during low utilization into order to save resources such as power consumption.

A first aspect of the present disclosure provides a system and method for using a network access device to configure an upstream configuration component and a downstream configuration component. The ability to configure these components allows different service groups to be mapped to different subscriber group output ports. This allows a flexible and adaptable system to be used and provide service in the event of a hardware failure.

A second aspect of the present disclosure provides a system and method for using a network node that comprises a communication distribution processor along with two network access components. The communication distribution processor is able to configure each of the network access components to redistributing network access data to lower power consumption or provide service in the event of hardware failure.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the invention be defined by the claims appended hereto.

What is claimed is:

1. A network node for use with a broadband data provider facility, a first subscriber group and a second subscriber group, the broadband data provider facility being operable to provide first service group provider data and second service group provider data, the network node comprising:

a network access device operable to convert the first service group provider data into first service group network access data and to convert the second service group provider data into second service group network access data, the first service group network access data to be provided to the first subscriber group, the second service group network access data to be provided to the second subscriber group; and a downstream configuration component operable to receive a configuration instruction, to receive the first service group network access data, to receive the second service group network access data and, based on the configuration instruction, to provide the first service group network access data to the first subscriber group and to provide the second service group network access data to the second subscriber group, wherein the downstream configuration component is further operable to receive a second configuration instruction and, based on the second configuration instruction, to provide the first service group network access data to the first subscriber group and to the second subscriber group.

2. The network node of claim 1, wherein the network access device is operable to generate the second configuration instruction based on a first traffic load of first network access data to be provided to the first subscriber group and a second traffic load of second network access data to be provided to the second subscriber group.

3. The network node of claim 1, wherein the network access device is further operable to receive a broadband data provider instruction from the broadband data provider facility and to generate the second configuration instruction based on the broadband data provider instruction.

4. The network node of claim 1, further comprising:

a first downstream service group communication channel in communication with the network access device; and a second downstream service group communication channel in communication with the network access device, wherein the network access device is further operable to provide the first service group network access data to the downstream configuration component via the first downstream service group communication channel, wherein the network access device is further operable to provide the second service group network access data to the downstream configuration component via the second downstream service group communication channel, and wherein the network access device is operable to generate the second configuration instruction based on the downstream configuration component not receiving the second service group network access data via the second downstream service group communication channel.

5. The network node of claim 1, wherein the network access device is operable to generate the first service group network access data as a type of network data selected from a group of types of network data consisting of passive optical network data, hybrid fiber-coaxial network data and wireless network data.

6. The network node of claim 1, wherein the network access device comprises a first network interface component, a second network interface component and a communication distribution processor, wherein the communication distribution processor comprises a communication component and a control component, wherein the communication component is operable to receive the first service group provider data and the second service group provider data from the broadband data provider facility, to send the first service group provider data to the first network interface component and to send the second service group provider data to the second network interface component, to provide the configuration instruction to the downstream configuration component and to provide the second configuration instruction to the downstream configuration component, wherein the first network interface component is operable to convert the first service group provider data into the first service group network access data and to provide the first service group network access data to the downstream configuration component, wherein the second network interface component is operable to convert the second service group provider data into the second service group network access data, and to provide the second service group network access data to the downstream configuration component, wherein the control component is operable to instruct the downstream configuration component, based on the configuration instruction, to provide the first service group network access data to the first subscriber group and to provide the second service group network access data to the second subscriber group, and wherein the control component is further operable to instruct the downstream configuration component, based on the second configuration instruction, to provide the first service group network access data to the first subscriber group and to the second subscriber group.

7. The network node of claim 6, wherein the communication component is further operable to receive the configuration instruction from the broadband data provider facility and to receive the second configuration instruction from the broadband data provider facility.

8. The network node of claim 6, wherein the control component is further operable to generate the configuration instruction and to generate the second configuration instruction.

9. The network node of claim 8, wherein the control component is further operable to generate the second configuration instruction based on conditions detected inside the network access device.

10. The network node of claim 9, wherein the control component is further operable to generate the configuration instruction based on conditions detected inside the network access device.

11. The network node of claim 9, wherein the control component is further operable to generate the second configuration instruction based on a malfunction of the communication component.

12. The network node of claim 9, wherein the control component is further operable to generate the second configuration instruction based on a malfunction of the first network interface component.

13. The network node of claim 6, wherein the control component is further operable to generate the second configuration instruction to save power.

14. The network node of claim 1, further comprising:

an upstream configuration component operable to receive a third configuration instruction, to receive first subscriber group access data from the first subscriber group, to receive second subscriber group access data from the second subscriber group, and, based on the third configuration instruction, to provide the first subscriber group access data to the network access device as first upstream service group network access data and to provide the second subscriber group access data to the network access device as second upstream service group network access data, and wherein the upstream configuration component is further operable to receive a fourth configuration instruction and, based on the fourth configuration instruction, to provide the first subscriber group access data and the second subscriber group access data to the network access device as the first upstream service group network access data.

15. The network node of claim 1, wherein the network access device operable to operate with a data over cable service interface specification physical layer and a medium access control layer, and wherein the network access device is further operable to operate without the medium access control layer based on conditions detected inside the network access device.

16. The network node of claim 1, wherein the network access device operable to operate with a data over cable service interface specification physical layer with a full duplex capability, and wherein the network access device is further operable to operate without the full duplex capability based on conditions detected inside the network access device.

17. A communication distribution processor for use with a broadband data provider facility, a first subscriber group, a second subscriber group, a first network interface component, a second network interface component and a downstream configuration component, the broadband data provider facility being operable to provide first service group provider data and second service group provider data, the first network interface component being operable to convert the first service group provider data into first service group network access data, the second network interface component being operable to convert the second service group provider data into second service group network access data, the downstream configuration component being operable to receive a configuration instruction, to receive the first service group network access data, to receive the second service group network access data and, based on the configuration instruction, to provide the first service group network access data to the first subscriber group and to provide the second service group network access data to the second subscriber group, the communication distribution processor comprising:

a communication component; and a control component, wherein the communication component is operable to receive the first service group provider data and the second service group provider data from the broadband data provider facility, to send the first service group provider data to the first network interface component, to send the second service group provider data to the second network interface component, to provide the configuration instruction to the downstream configuration component and to provide a second configuration instruction to the downstream configuration component, wherein the first network interface component is operable to convert the first service group provider data into the first service group network access data and to provide the first service group network access data to the downstream configuration component, wherein the second network interface component is operable to convert the second service group provider data into the second service group network access data, and to provide the second service group network access data to the downstream configuration component, wherein the control component is operable to instruct the downstream configuration component, based on the configuration instruction, to provide the first service group network access data to the first subscriber group and to provide the second service group network access data to the second subscriber group, and wherein the control component is further operable to instruct the downstream configuration component, based on the second configuration instruction, to provide the first service group network access data to the first subscriber group and to the second subscriber group.

18. A method of using a network node with a broadband data provider facility, a first subscriber group and a second subscriber group, the broadband data provider facility being operable to provide first service group provider data and second service group provider data, the method comprising:

converting, via a network access device, the first service group provider data into first service group network access data, the first service group network access data to be provided to the first subscriber group;

converting, via the network access device, the second service group provider data into second service group network access data, the second service group network access data to be provided to the second subscriber group;

receiving, via a downstream configuration component, a configuration instruction;

receiving, via the downstream configuration component, the first service group network access data;

receiving, via the downstream configuration component, the second service group network access data;

providing, via the downstream configuration component and based on the configuration instruction, the first service group network access data to the first subscriber group;

providing, via the downstream configuration component and based on the configuration instruction, the second service group network access data to the second subscriber group, receiving, via the downstream configuration component, receive a second configuration instruction; and providing, via the downstream configuration component and based on the second configuration instruction, the first service group network access data to the first subscriber group and to the second subscriber group.

* * * * *